US009606224B2

(12) United States Patent
Soderi et al.

(10) Patent No.: US 9,606,224 B2
(45) Date of Patent: Mar. 28, 2017

(54) SYSTEMS AND METHODS FOR VEHICLE POSITION DETECTION

(71) Applicant: General Electric Company, Schenectady, NY (US)

(72) Inventors: Simone Soderi, Florence (IT); Roberto Giusto, Rome (IT)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 485 days.

(21) Appl. No.: 14/154,297

(22) Filed: Jan. 14, 2014

(65) Prior Publication Data

US 2015/0198712 A1 Jul. 16, 2015

(51) Int. Cl.
*G01S 13/84* (2006.01)
*B61L 25/00* (2006.01)
(Continued)

(52) U.S. Cl.
CPC .............. *G01S 13/84* (2013.01); *B61L 25/00* (2013.01); *B61L 27/00* (2013.01); *G01S 11/06* (2013.01);
(Continued)

(58) Field of Classification Search
CPC ..... G01S 1/10; G01S 1/20; G01S 5/00; G01S 5/0009; G01S 5/0018; G01S 11/02;
(Continued)

(56) References Cited

U.S. PATENT DOCUMENTS 3,366,952 A * 1/1968 Mori ..................... B61L 25/041
342/188
3,426,349 A * 2/1969 Gareis ..................... B61L 3/121
342/51
(Continued)

FOREIGN PATENT DOCUMENTS

EP 1321776 A1 6/2003
EP 2676860 A1 12/2013

OTHER PUBLICATIONS

International Search Report and Written Opinion issued in connection with corresponding PCT Application No. PCT/US2015/010392 dated Mar. 27, 2015.
(Continued)

*Primary Examiner* — Peter Bythrow
(74) *Attorney, Agent, or Firm* — Christopher R. Carroll; The Small Patent Law Group LLC.

(57) ABSTRACT

A system includes a transmission unit, a first reception antenna, a second reception antenna, and a processing unit. The transmission unit is configured to be disposed onboard a vehicle traversing a route, includes a transmission antenna, and is configured to transmit a location signal to a target disposed along the route as the vehicle traverses the route. The first reception antenna is configured to receive at least one reflection signal of the location signal reflected off the target. The second reception antenna is configured to receive the at least one reflection signal. The processing unit is configured to obtain first reception information from the first reception antenna and second reception information from
(Continued)

the second reception antenna, perform a comparison of the first and second reception information, and determine a position of the vehicle using the comparison of the first and second reception information.

14 Claims, 8 Drawing Sheets

(51) Int. Cl.

| | | |
|---|---|---|
| G01S 13/75 | (2006.01) | |
| G01S 13/32 | (2006.01) | |
| G01S 13/76 | (2006.01) | |
| G01S 13/06 | (2006.01) | |
| B61L 27/00 | (2006.01) | |
| G01S 11/06 | (2006.01) | |
| G01S 13/60 | (2006.01) | |
| G01S 5/00 | (2006.01) | |
| G01S 1/10 | (2006.01) | |

(52) U.S. Cl.
CPC ............. *G01S 13/06* (2013.01); *G01S 13/32* (2013.01); *G01S 13/60* (2013.01); *G01S 13/75* (2013.01); *G01S 13/765* (2013.01); *B61L 2205/00* (2013.01); *G01S 1/10* (2013.01); *G01S 5/0009* (2013.01)

(58) Field of Classification Search
CPC .......... G01S 11/04; G01S 11/06; G01S 13/06; G01S 13/32; G01S 13/60; G01S 13/75; G01S 13/765; G01S 13/84; G01S 13/93; G01S 13/931; B61L 25/00–25/028; B61L 2205/00; B61L 27/00; B61L 27/0005; B61L 27/0077; B61L 15/0072; B61L 15/0018
USPC ....... 342/42, 46, 47, 50, 104, 107, 108, 109, 342/113, 118, 128, 146, 189, 192
See application file for complete search history.

(56) References Cited

U.S. PATENT DOCUMENTS

| | | | | |
|---|---|---|---|---|
| 4,027,840 A * | 6/1977 | Blair | ...................... | B61L 25/025 246/122 R |
| 4,040,053 A * | 8/1977 | Olsson | ................... | B61L 25/043 246/122 R |
| 4,207,569 A * | 6/1980 | Meyer | .................... | G01S 13/765 246/121 |
| 4,464,662 A * | 8/1984 | Tomasi | .................... | G01S 13/48 342/125 |
| 4,768,740 A * | 9/1988 | Corrie | ..................... | B61L 3/125 104/295 |
| 4,804,961 A * | 2/1989 | Hane | ........................ | G01S 13/84 342/125 |
| 4,912,471 A * | 3/1990 | Tyburski | ............... | B61L 25/045 340/10.34 |
| 5,227,803 A * | 7/1993 | O'Connor | ............ | G07B 15/063 342/156 |
| 5,332,180 A * | 7/1994 | Peterson | ................. | B61L 3/004 246/122 R |
| 5,485,520 A * | 1/1996 | Chaum | ................ | G06K 7/0008 235/379 |
| 5,532,697 A * | 7/1996 | Hidaka | .................... | G01S 13/60 342/104 |
| 5,682,139 A * | 10/1997 | Pradeep | ................ | B61L 25/021 340/10.31 |
| 5,684,489 A * | 11/1997 | Fournier | ................. | G01S 13/84 342/118 |
| 5,862,456 A * | 1/1999 | Bode | .................... | G06K 7/0008 342/42 |
| 6,034,646 A * | 3/2000 | Heddebaut | .............. | B61L 3/227 342/457 |
| 6,072,421 A * | 6/2000 | Fukae | ................... | G01S 13/876 342/126 |
| 6,084,530 A * | 7/2000 | Pidwerbetsky | ....... | G01S 13/825 340/10.1 |
| 6,215,438 B1* | 4/2001 | Oswald | ................. | G01S 13/931 342/104 |
| 6,219,596 B1* | 4/2001 | Fukae | ..................... | G01S 17/74 180/169 |
| 6,433,671 B1* | 8/2002 | Nysen | ................... | G01S 13/755 340/10.1 |
| 6,570,497 B2* | 5/2003 | Puckette, IV | ............ | B61K 9/08 340/301 |
| 6,728,515 B1* | 4/2004 | Wooh | ................... | H01Q 3/2682 455/67.11 |
| 7,034,741 B2* | 4/2006 | Chon | ................... | G08G 1/0962 342/42 |
| 7,202,822 B2* | 4/2007 | Baliarda | ............... | H01Q 1/36 343/700 MS |
| 7,646,330 B2* | 1/2010 | Karr | ...................... | G01S 13/765 340/10.1 |
| 7,825,802 B2* | 11/2010 | Baiker | ...................... | B61L 1/10 340/10.1 |
| 7,868,817 B2* | 1/2011 | Meyers | ............... | G01S 13/4454 342/118 |
| 7,956,796 B2* | 6/2011 | Hyodo | .................. | G01S 13/04 342/118 |
| 8,249,618 B2* | 8/2012 | Fireaizen | .................. | G01S 1/20 342/393 |
| 9,227,641 B2* | 1/2016 | Schwellnus | ............. | B61L 25/02 |
| 2002/0008656 A1* | 1/2002 | Landt | ...................... | G01S 3/043 342/42 |
| 2002/0102995 A1* | 8/2002 | Zelmanovich | .......... | G01S 1/026 455/456.5 |
| 2003/0112172 A1* | 6/2003 | Shinoda | ............... | G01S 13/4463 342/70 |
| 2004/0032363 A1* | 2/2004 | Schantz | ............... | H04B 5/0075 342/127 |
| 2005/0046608 A1* | 3/2005 | Schantz | ............... | H04B 5/0075 342/127 |
| 2005/0128131 A1* | 6/2005 | Rosenberg | .............. | G01S 13/78 342/45 |
| 2005/0137760 A1* | 6/2005 | Watanabe | ................ | B61L 1/18 701/19 |
| 2005/0278982 A1* | 12/2005 | Herzog | ................... | E01B 27/02 37/104 |
| 2006/0132352 A1* | 6/2006 | Schantz | ............... | G01C 21/206 342/125 |
| 2007/0096983 A1* | 5/2007 | Sabina | .................... | B61L 3/126 342/385 |
| 2008/0231506 A1* | 9/2008 | Stull | ...................... | B61L 3/125 342/357.33 |
| 2009/0198391 A1* | 8/2009 | Kumar | ..................... | B60L 3/12 701/2 |
| 2010/0001896 A1* | 1/2010 | Fiereizen | .............. | G01S 13/878 342/42 |
| 2010/0026562 A1* | 2/2010 | Hyodo | .................... | G01S 13/04 342/189 |
| 2010/0271188 A1* | 10/2010 | Nysen | ..................... | G01S 13/755 340/10.41 |
| 2012/0139774 A1* | 6/2012 | Nagy | ...................... | G01S 11/10 342/128 |
| 2012/0173055 A1* | 7/2012 | Yamamoto | ................ | B60L 9/00 701/20 |
| 2013/0062474 A1* | 3/2013 | Baldwin | ............... | B61L 29/282 246/122 R |

(56) References Cited

U.S. PATENT DOCUMENTS

| | | | | |
|---|---|---|---|---|
| 2013/0138276 A1* | 5/2013 | Soderi | ................... | B61L 3/008 |
| | | | | 701/19 |
| 2013/0336367 A1* | 12/2013 | Soderi | ................... | H04B 1/707 |
| | | | | 375/144 |
| 2013/0337856 A1* | 12/2013 | Soderi | ................... | H04B 15/02 |
| | | | | 455/501 |
| 2014/0278214 A1* | 9/2014 | Broad | ................... | G01S 3/50 |
| | | | | 702/150 |
| 2014/0326835 A1* | 11/2014 | Schwellnus | ............ | B61L 25/02 |
| | | | | 246/122 R |

OTHER PUBLICATIONS

McDonald, "Small Fractal Antennas", Joseph Henry Laboratories, Princeton University, Princeton, NJ 08544 (Dec. 22, 2003).

\* cited by examiner

SYSTEMS AND METHODS FOR VEHICLE POSITION DETECTION

BACKGROUND

Wayside equipment in a transportation network may be used to help determine location of a vehicle as the vehicle travels in the network. For example, a wayside device may transmit a beacon or signal used by a vehicle to determine an approximate position of the vehicle. Some transportation systems, including systems operating under the European Train Control System (ETCS) standard, utilize Balise Transmission Modules (BTMs). The current BTM/ETCS standard implements data communication between a train and wayside infrastructure (e.g., a balise mounted along a route of the network) using two independent wireless links. A telepowering high power transmission from onboard equipment is sent via a first wireless link (down-link), and information is transmitted from the wayside equipment to the vehicle via a second wireless link (up-link).

Current systems base balise detection on received signal strength indication (RSSI) measurements of up-link signal strength. The up-link transmission is based on inductive transponders (e.g., balises), that are available from different manufacturers. The equipment may perform up-link transmission and telepowering in different ways based on different manufacturing sources and/or specifications, creating discontinuity from the transmission point of view, resulting in inaccuracy of position determinations. Further, inductive transponders used with current RSSI detection methods do not provide desired accuracy in balise position measurement, and may be prone to false detection due to cross-talk with adjacent tracks. Further still, as balises or other wayside equipment may be exposed to challenging environments, the equipment may suffer damage, and be unable to send a recognizable signal.

Alternative approaches may employ image processing for object detection. However, these approaches may suffer the drawbacks of requiring considerable post-processing computational burden as well as additional complexity and costs of onboard equipment.

BRIEF DESCRIPTION

In an embodiment, a system is provided including a transmission unit, a first reception antenna, a second reception antenna, and a processing unit. As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

The transmission unit is configured to be disposed onboard a vehicle traversing (e.g., traveling along) a route. The transmission unit includes a transmission antenna and is configured to transmit a location signal to a target disposed along the route as the vehicle traverses the route. The first reception antenna is configured to receive at least one reflection signal of the location signal reflected off the target. The second reception antenna is configured to also receive the at least one reflection signal reflected off the target. The processing unit is operably connected to the first reception antenna and the second reception antenna, and is configured to obtain first reception information from the first reception antenna and second reception information from the second reception antenna, perform a comparison of the first and second reception information, and determine a position of at least one of the vehicle or the target using the comparison of the first and second reception information. As used herein "first reception information" may be understood to include all or a portion of a message or signal received via the first reception antenna, and/or information characterizing, describing, relating to, or corresponding to a signal or message received via the first reception antenna. For example, the first reception information may include an amplitude of a signal received by the first reception antenna. Similarly, "second reception information" may include all or a portion of a message or signal received via the second reception antenna, and/or information characterizing, describing, relating to, or corresponding to a signal or message received via the second reception antenna. For example, the second reception information may include an amplitude of a signal received by the second reception antenna.

In an embodiment, a method (e.g., method for determining the position of at least one of a vehicle traversing a route or a target disposed along the route) includes transmitting, from a transmission unit including a transmission antenna disposed onboard the vehicle, a location signal to a target disposed along the route as the vehicle traverses the route. The method also includes receiving, at a first reception antenna disposed onboard the vehicle, at least one reflection signal of the location signal reflected off the target. Also, the method includes receiving, at a second reception antenna disposed onboard the vehicle, the at least one reflection signal reflected off the target. Further, the method includes comparing first reception information from the first reception antenna and second reception information from the second reception antenna, and determining a position of at least one of the vehicle or the target using the comparison of the first and second reception information.

In an embodiment, a tangible and non-transitory computer readable medium is provided. The computer readable medium is configured to direct one or more processors to transmit, from a transmission unit comprising a transmission antenna disposed onboard a vehicle traversing the route, a location signal to a target disposed along the route as the vehicle traverses the route. The computer readable medium is also configured to direct one or more processors to compare first reception information from a first reception antenna and second reception information from a second reception antenna, where the first reception information corresponds to at least one reflection signal of the location signal reflected off the target received by the first reception antenna and the second reception information corresponds to the at least one reflection signal of the location signal reflected off the target received by the second reception antenna. Also, the computer readable medium is configured to direct one or more processors to determine a position of at least one of the vehicle or the target using the comparison of the first and second reception information.

BRIEF DESCRIPTION OF THE DRAWINGS

The inventive subject matter will be better understood from reading the following description of non-limiting embodiments, with reference to the attached drawings, wherein below.

DETAILED DESCRIPTION

Figure 1:
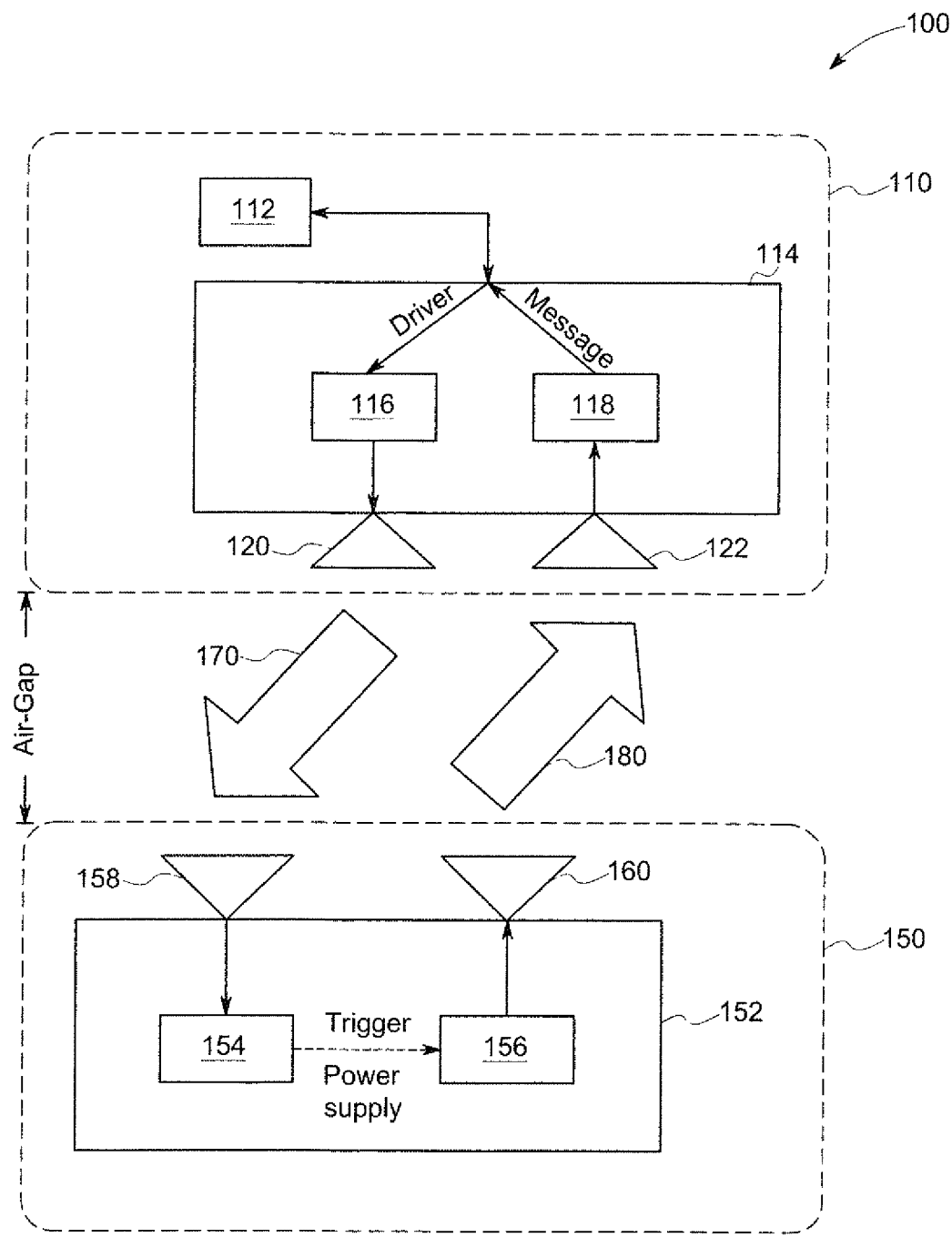
FIG. 1 is a schematic view of a positioning system.

The term vehicle consist is used in this document. A vehicle consist can be a group of two or more vehicles that are mechanically coupled to travel together along a route. Optionally, a vehicle consist may have a single propulsion-generating unit or vehicle. The vehicles in a vehicle consist can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with or without other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a rail car, passenger car, or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and another remote consist at the end of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist.

As used herein, a vehicle or vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like.

One or more embodiments of the inventive subject matter described herein provide methods and systems for improved determination of position or location of a vehicle. For example, a position or location of a vehicle along a route relative to a position of wayside equipment may be determined. In some embodiments, a time at which a vehicle (or a portion of the vehicle) passes wayside equipment may be determined and used to determine the position of the vehicle.

In some embodiments, a telepowering signal used in connection with an existing standard may be employed as an opportunity signal to determine position of a vehicle. For example, a pair of antennae may be used to detect echoes or reflections of the telepowering signal off of a balise or other target. Because each antenna of the pair is differently located relative to the target, each antenna will receive the echoes or reflections differently. The amplitudes of signals received by each antenna will differ, and the amplitudes may be compared to obtain accurate detection of target position relative to the vehicle. With the position of the target (which may be fixed along the track) known, the position of the vehicle at a given time may be determined, for example, using an original time at which the vehicle is at a known position relative to the target (e.g., a portion of the vehicle is directly over the target), the elapsed time between the given time and the original time, and the speed of the vehicle over the elapsed time. It may be noted that the determination of position using echoes or reflections may be performed alternatively or additionally to the transmission of information from the target (e.g., a balise). Thus, in some embodiments, the determination of position may be performed without the reception of a transmission from the target, thereby eliminating the need for transmission capability of the target and reducing cost of the target, and/or providing for the determination of position if the target is damage or broken and incapable of proper transmission. In other embodiments, the determination of position may be performed along with reception of a transmission of a target. For example, a RSSI determination based on a transmission from a target and/or identification information included in a target transmission may be used to check or verify a position determination made using the reflections or echoes off of the target.

At least one technical effect of various embodiments described herein includes improved accuracy in detection of vehicle position. Another technical effect includes detection of position even if a balise or other target is broken or damaged and incapable of transmitting a properly configured message or "telegram." Another technical effect includes detection of position without use of an up-link signal from wayside equipment. Another technical effect includes the provision of redundancy and improved reliability in detection (e.g., determining position using reflections of a telepowering signal as well as an up-link transmission). Another technical effect includes improved identification of broken or damaged wayside equipment.

FIG. 1 is a schematic view of a positioning system 100, for example, that may be used under the ETCS. The system 100 includes an on-board equipment module 110 and a wayside equipment module 150. The on-board equipment module 110 may be disposed onboard a vehicle traversing a route. The wayside equipment module 150 may be disposed along the route. As the vehicle passes the wayside equipment module 150, the vehicle transmits a telepowering signal 170 to the wayside equipment module 150. The wayside equipment module 150, responsive to receipt of the telepowering signal 170, is configured to transmit an uplink message 180 or "telegram" to the vehicle.

For example, the telepowering signal may be transmitted at about 20 Watts and have a frequency of about 27 MHz (e.g., 27.095 MHz). The wayside equipment module 150 may receive the telepowering signal 170. The wayside equipment module 150, for example, may be configured as a balise configured for use under the ETCS. Generally, a balise may be understood as an electronic beacon that is disposed between rails of a railway. The balise may be used as a part of an automatic train protection system. The telepowering signal 170 may provide power to the wayside equipment module 150, so that the wayside equipment module 150 may not require a separate power source. The wayside equipment module 150 may then transmit a "telegram" or uplink message 180, which may contain information identifying the wayside equipment module 150 and/or additional information regarding, for example, track conditions such as speed limits, directional information identifying a sequence of balises, or the like. The uplink message 180 may be sent at about 4.25 MHz (e.g., 4.234 MHz). The uplink message 180 may have a size of 341 bits in some embodiments, or a size of about 1023 bits in other embodiments. Further, in various embodiments, the telepowering signal 170 and/or the uplink message 180 may be modulated, for example, to provide improved identification of the telepowering signal 170 and/or the uplink message 180 (e.g., to distinguish the telepowering signal 170 and/or the uplink message 180 from other signals or noise). It should be noted that the above frequencies and/or sizes of the various messages are provided by way of example for illustrative purposes, and that other message configurations may be employed in other embodiments.

The on-board equipment module 110 may then determine the location of the vehicle using the uplink message 180. For example, a RSSI measurement of the uplink message 180 may be used to determine when the vehicle is at or near a point or location of greatest proximity of a particular location along the vehicle to the wayside equipment module 150 as the vehicle approaches and passes over the wayside equipment module 150. With the position of the wayside equipment module 150 (which is fixed in relationship to the route) known a priori, the position of the vehicle may thus be determined.

In the illustrated embodiment, the on-board equipment module 110 includes a computer 112 and a balise transmission module (BTM) 114 including a telepowering antenna 120 and an uplink reception antenna 122. The computer 112 is configured to exchange information with the BTM 114, and to determine a position of the vehicle using information provided by the BTM 114. The computer 112 may also provide a driving signal to the BTM module for generating the telepowering signal 170.

The depicted BTM 114 includes a telepowering transmission modulator 116 and an uplink reception demodulator 118. The telepowering transmission modulator 116 is operably connected to the telepowering antenna 120, and configured to modulate a telepowering signal (e.g., telepowering signal 170), for example utilizing a drive signal or driver provided by the computer 112. The uplink reception demodulator 118 is operably connected to the uplink reception antenna 122 and is configured to demodulate a received signal (e.g., uplink message 180).

In the illustrated embodiment, the wayside equipment module 150 is configured as a balise 152 including a telepowering reception signal demodulator 154, an uplink transmission modulator 156, a telepowering reception antenna 158, and an uplink transmission antenna 160. The telepowering reception signal demodulator 154 is operably connected to the telepowering reception antenna 158, and is configured to demodulate the received telepowering signal 170 received by the telepowering reception antenna 158. The wayside equipment module 150 may be supplied with power by the telepowering signal 170. Also, reception and/or demodulation of the telepowering signal 170 in the illustrated embodiment is used to trigger transmission of the uplink message 180. The depicted uplink transmission modulator 156 is operably connected to the uplink transmission antenna 160, and is configured to generate and modulate the uplink message 180 which is transmitted via the uplink transmission antenna 160 to the onboard equipment module 110 via the uplink reception antenna 122.

Thus, a vehicle may transmit a telepowering signal 170 to the wayside equipment module 150 (e.g., balise) and receive the uplink message 180 as the vehicle passes over and/or by the wayside equipment module 150. The uplink message 180 may be used by the vehicle to identify a position of the vehicle relative to the wayside equipment module 150, and thus determine the position of the vehicle. Reliance on the uplink message 180 alone, however, may provide less than desired accuracy. Further, the transmission and/or reception of the uplink message 180 may be subject to cross-talk or other problems. Further still, the uplink message 180 may not provide for effective position determination if the balise is damaged or if the transmission of the uplink message 180 is inhibited, prevented, or otherwise compromised due to other difficulties in transmission. Yet, further still, inconsistencies between balises or wayside equipment manufactured by different manufacturers and/or under different specifications may lead to inaccuracy or inconsistency in the determination of position.

Figure 2:
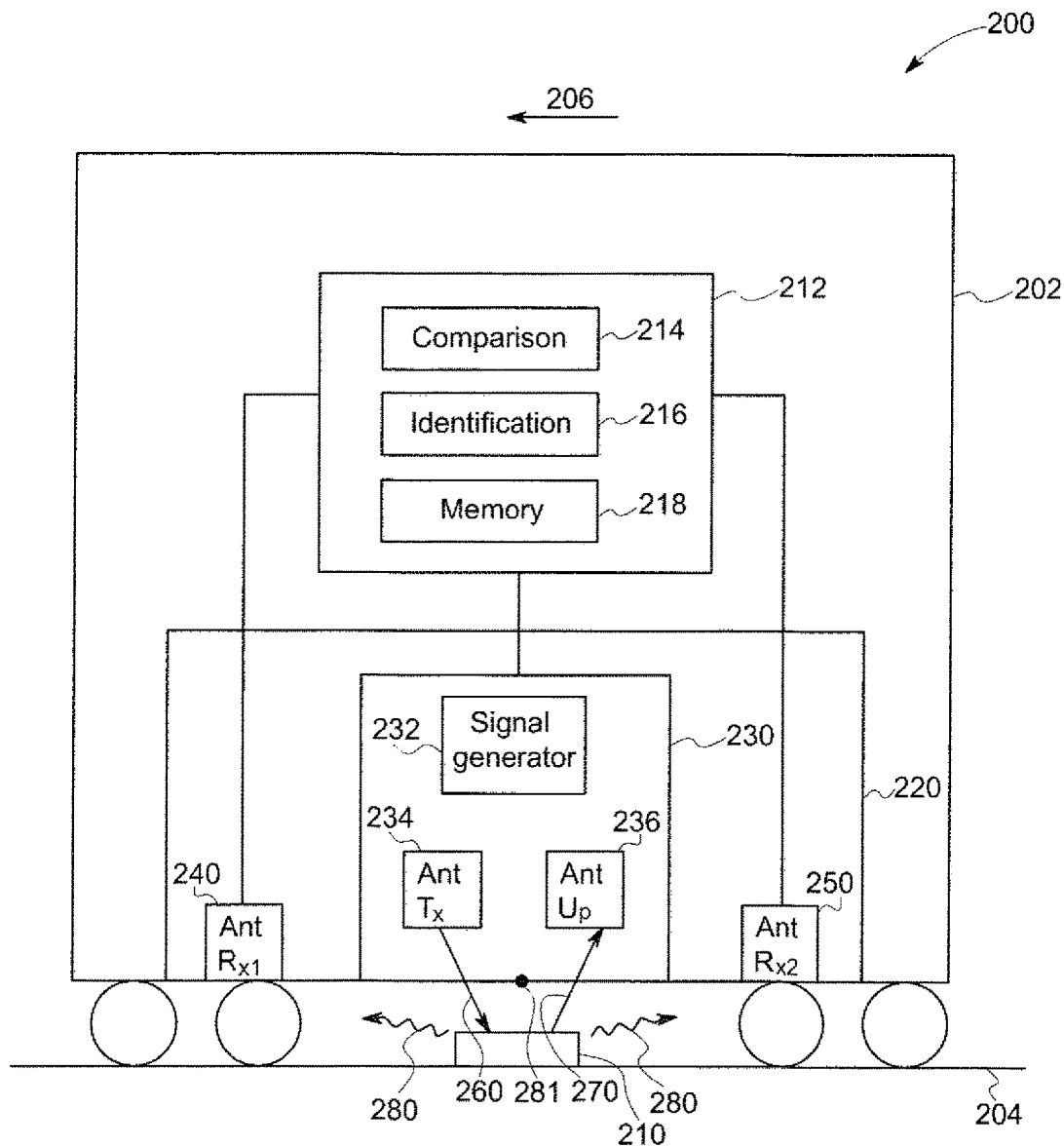
FIG. 2 is a schematic view of a transportation system, according to an embodiment.

Various embodiments provide improved determination of position using plural (e.g., two) antennae to detect echoes or reflections of a transmitted signal. For example, in some embodiments, a telepowering signal similar to the telepowering signal 170 may be transmitted, and echoes or reflections of the telepowering signal off of a target may be utilized to determine position of a vehicle passing over or by the target. FIG. 2 is a schematic view of a transportation system 200 formed in accordance with various embodiments. The transportation system 200 includes a vehicle 202 traversing a route 204, with a target 210 disposed along the route 204. The vehicle 202, for example, may be configured as a powered rail vehicle (e.g., locomotive) or vehicle consist traveling over a track including one or more rails in a direction of travel 206. In other embodiments, other vehicle types or configurations may be used. For instance, in some embodiments, the vehicle 202 may be configured as an automobile or truck passing over a target disposed in or by a roadway. Thus, in various embodiments, the route 204 may include a track having one or more rails, a roadway, or the like. Other types of vehicle and/or routes may be utilized in alternate embodiments. The vehicle 202 is configured to transmit a transmission signal 260, which may be understood as a location signal. In some embodiments, the transmission signal 260 may be substantially similar in respects to the telepowering signal 170 discussed herein in connection with FIG. 1. Generally, the target 210 is configured to provide identifiable or discernible echoes or reflections 280 of the transmission signal 260. For example, the target 210 may be configured as a block of metal having a predetermined size and shape, with the target configured and position to reduce, minimize, or eliminate the potential for confusing echoes or reflections off of a different structure along the route 204 with echoes or reflections off of the target. In the illustrated embodiment, the transmission signal 260 is configured as a telepowering signal, and the target 210 is configured to transmit an uplink message 270 responsive to receiving the transmission signal 260. The uplink message 270 may be generally similar in respects to the uplink message 180 discussed herein in connection with FIG. 1. In various embodiments, the target 210 may not be configured to transmit an uplink message, and the transmission signal 260 may not be configured for telepowering.

As the vehicle 202 continues traveling over the route 204 in the direction of travel 206, the vehicle 202 passes over the target 210. The vehicle 202 transmits the transmission signal 260, and reflections 280 of the transmission signal 260 off of the target 210 are received by the vehicle 202 (e.g., via plural reception antennae disposed onboard the vehicle 202), and analyzed (e.g., with a computer or processing unit disposed onboard the vehicle 202) to determine when the vehicle 202 (e.g., a portion of the vehicle 202 interposed between the reception antennae) passes directly over the target 210. For example, the relative amplitudes of reflections of the transmission signal 260 received at different antennae disposed at different positions along the vehicle 202 may be compared to determine a time at which the vehicle 202 passes directly over the target 210. In some embodiments, a portion of the vehicle 202 (e.g., a reference point 281 along the vehicle 202 disposed between the reception antennae, for example at a midpoint between the reception antennae along the length of the vehicle 202) may be determined to be directly over the target 210 when the difference between the amplitudes of reflections received by the reception antennae is at a maximum. The location of other portions of the vehicle 202 (e.g., a front of the vehicle 202, a rear of the vehicle 202, one or more doors of the vehicle 202) may be determined by adjusting the determined position of the reference point 281 by a known distance from the reference point to a given portion of the vehicle 202.

By determining the time at which the vehicle 202 (e.g., a portion of the vehicle at a known position along the vehicle, such as the reference point 281) passes over the target 210, and knowing the speed of the vehicle 202, the position of the vehicle 202 at a given time after passage over the target 210 may be determined. In some embodiments, the position of the target 210 along the route may be known a priori. For example, based on a planned mission, the vehicle 202 may include a memory storing a database listing plural targets 210 disposed along the route 206 expected to be encountered during the mission, the location (e.g., listings based on geographical coordinates and/or distance postings such as mile markers along a route) of each target 210, and an expected order in which the targets 210 are to be encountered. Additionally or alternatively, the target 210 may transmit information, for example as part of the uplink message 270, identifying the position and/or location of the particular target 210 sending the uplink message 270. It may be noted that, in various embodiments, the transmission signal 260 may include a modulated component to improve identification of the transmission signal 260 and/or the reflections 280, and/or to improve distinguishing the transmission signal 260 and/or the reflections 280 from the target 210 from other signals that may be present, as the vehicle 202 may pass through environments having relatively high levels of noise and/or additional signals present. In some embodiments, the location of the target 210 may be determined. If the position of the vehicle 202 is known or may otherwise be determined or approximated at the time the vehicle 202 passes over the target 210, the location of the target 210 may be determined or approximated based on the location of the vehicle 202. As one example, if the vehicle 202 identifies a target 210 that is not identified in a database of expected targets, the location of the target 210 may be determined or approximated using a previously known location of the vehicle at an initial time, the elapsed time since the initial time, and the speed of the vehicle during the elapsed time. With the location of the target 210 determined, the target 210 may be investigated to determine why the target 210 was detected but not listed in the database (e.g., the identified target was inadvertently omitted, or the identified target was a false positive, among others).

As discussed above, the target 210 is configured to provide recognizable or discernible reflections 280 of the transmission signal 260. In the illustrated embodiment, the target 210 is also configured as a beacon or transponder (e.g., a balise) to transmit the uplink signal 270. The uplink signal 270 may be used to confirm or check a position determination made based on the reflections 280. For example, a position determined by a relative strength of the uplink signal 270 as received by the vehicle 202 may be compared with a position determined based on the reflections 280. Additionally or alternatively, the vehicle 202 (e.g., a computer or processing unit disposed on the vehicle 202) may be configured to identify broken or damaged targets 210 based on the uplink signal 270. For example, if a target 210 is passed over by the vehicle 202, but no uplink signal is received, or if an uplink signal having a maximum amplitude below a predetermined threshold or otherwise varying from an expected uplink signal is received, the target 210 may be identified as damaged or otherwise non-functional. It may be noted that in other embodiments, the target 210 may not be configured to transmit an uplink signal 270. For example, the target 210 may be configured as a solid metal block or unit. Use of solid metal targets 210, for example, may reduce costs of manufacture, installation, and maintenance of targets 210.

The depicted vehicle 202 includes a processing unit 212 and a transceiver unit 220. In the illustrated embodiment, the processing unit 212 and the transceiver unit 220 (including the reception antennae 240, 250) are disposed on the vehicle 202 and are operably coupled with each other. The transceiver unit 220 is configured to send signals (e.g., the transmission signal 260) and to receive signals (e.g., the uplink signal 270, the reflections 280). The processing unit 212 is configured to obtain information (e.g., a message from a received signal and/or signal characteristics such as amplitude of received signals) from the transceiver unit 220 and to analyze the received information from received signals. For example, the depicted processing unit 212 is configured to determine the position of the vehicle 202 and/or a time of passage over target 210 using at least part of the received information.

The depicted transceiver unit 220 includes a transmission unit 230, a first reception antenna 240, and a second reception antenna 250. The transceiver unit 220 in the illustrated embodiment is configured to transmit the transmission signal 260 to the target 210 (e.g., via the transmission unit 230), to receive echoes or reflections 280 of the transmission signal 260 (e.g., via the first reception antenna 240 and the second reception antenna 250), and to receive the uplink signal 270 from the target 210 (e.g., via the transmission unit 230). The transmission signal 260, for example, may be a telepowering signal at about 20 Watts and about 27 MHZ. The transmission signal 260 may be used to provide power to wake-up or activate the target 210, to provide power to the target 210, and to provide echoes or reflections 280 off of the target 210 that may be used to identify the position of the vehicle 202, for example via a determination of a time the vehicle 202 passes over the target 210. The transmission signal 270, for example, may be transmitted at about 4 Mhz from the target 210 responsive to the target 210 receiving the transmission signal 260. In various embodiments, the transceiver unit 220 may also include a processing portion or other circuitry configured to filter or otherwise process one or more signals received by the various reception antennae of the vehicle 202.

In the illustrated embodiment, the transmission unit 230 includes a signal generator 232, a transmission antenna 234 and an uplink antenna 236. The transmission antenna 234 is configured to transmit the transmission signal 260, and the signal generator 232 is configured to generate a signal provided to the transmission antenna 234 and used to transmit the transmission signal 260. The signal generator 232 in various embodiments may generate a modulated signal. For example, the transmission signal 260 may include a first or carrier component and a second or IF component. The modulated or IF component may be utilized, for example, as a "fingerprint" or other identifier, to improve identification of the transmission signal 260 (and/or the reflections 280 of the transmission signal 280) and discernment of the reflections 280 from other signals or noise that may be present.

The uplink antenna 236 is configured to receive the uplink signal 270. The uplink signal 270 in various embodiments may include identification information regarding the target 210 and/or information regarding upcoming portions of the route 204. The information from the target 210 may be received via the uplink antenna 236 and forwarded to the processing unit 212. The processing unit 212 may also obtain information regarding signal strength of the uplink signal 270 which may be used to check or confirm a determination of position made using the reflections 280. Alternatively or additionally, information received via the uplink signal 270 may be used to one or more of monitor progress along route, confirm that a particular target has been passed over, or help identify broken or damaged targets. Generally, in various embodiments, the transmission antenna 234, uplink antenna 236, and signal generator 232 may be similar in respects to the embodiment discussed in FIG. 1, and may be used in conjunction with a system that uses balises (e.g., ETCS). In other embodiments, other configurations may be used. For example, in some embodiments, the target 210 may not be configured to transmit the uplink signal 270. In such embodiments, the uplink antenna 236 may not be present, or may not be utilized if present. It should also be noted that the power and/or frequency of signals provided herein are for illustrative purposes, and that other powers and/or frequencies and/or types (e.g., unmodulated) signals may be used in other embodiments.

In addition to the uplink antenna 236 of the transmission unit 230 configured to receive the uplink signal 270, the depicted transceiver unit 220 also includes antennae configured to receive the reflections 280, namely, the first reception antenna 240 and the second reception antenna 250. In the illustrated embodiment, the first reception antenna 240 and the second reception antenna 250 are disposed on opposite sides of the transmission antenna 234 and the uplink antenna 236. The reference point 281 of the illustrated embodiment is disposed at a midpoint between the first reception antenna 240 and the second reception antenna. The first reception antenna 240 and the second reception antenna 250 are configured to receive the echoes or reflections 280 of the transmission signal. Information received by the first reception antenna 240 and the second reception antenna 250 may be processed (e.g., filtered, amplified) and analyzed. For example, information received by the first reception antenna 240 and the second reception antenna 250 may be analyzed to confirm that the information corresponds to echoes or reflections of the transmission signal 260, for example based on modulations of the transmission signal 260. The information received by the first reception antenna 240 and the second reception antenna 250 may also be used to determine the position of the vehicle 202, for example by analyzing differences in the amplitude of the signal received by the first reception antenna 240 and the amplitude of the signal received by the second reception antenna 250.

In various embodiments, the first reception antenna 240 and the second reception antenna 250 may be configured as short dipole fractal antennae. In some embodiments, a short dipole antenna may be understood as an antenna formed by two conductors whose length is no more than about $\frac{1}{10}$ of the signal wavelength. A fractal antenna as used herein may be understood as an antenna that utilizes a fractal or self-similar design to increase a length or perimeter of an antenna within a given area or volume. The particular size and configuration of the first reception antenna 240 and the second reception antenna 250 may be tailored for a particular application (e.g., based on nominal wavelength of the transmission signal 260, based on available space on the vehicle 202). Further, the first reception antenna 240 and the second reception antenna 250 may be configured for fine tuning. Thus, the first reception antenna 240 and the second reception antenna 250 may be configured for a nominal wavelength of the transmission signal 260, but may be fine tunable (e.g., during operation or performance of a mission) for improved performance. For example, the first reception antenna 240 and the second reception antenna 250 may be configured to be fine-tunable by including circuitry, such as varactor diodes, that provide for fine tuning from a nominal frequency to an actual frequency (e.g., of the transmission signal 260) encountered during actual use.

Figure 3:
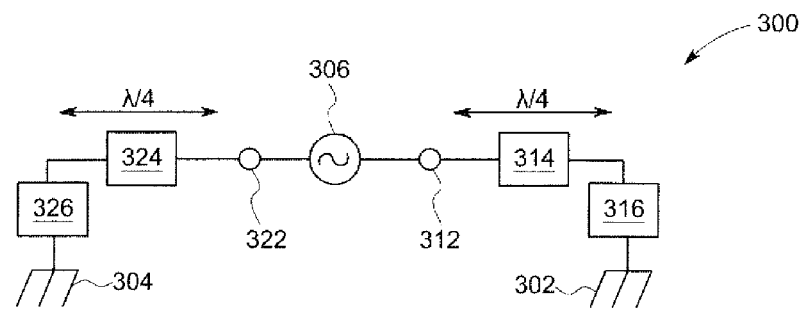
FIG. 3 is a schematic view of a tunable fractal short dipole antenna, according to an embodiment.
Figure 4:
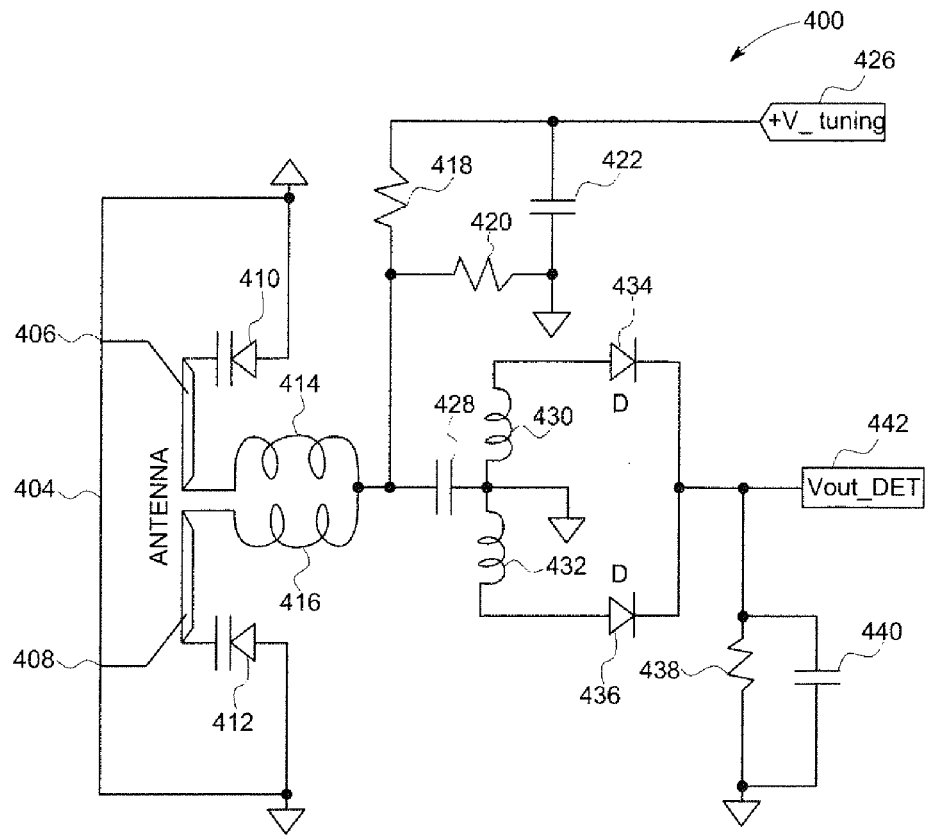
FIG. 4 is a schematic diagram of a tunable fractal short dipole antenna circuit, according to an embodiment.
Figure 5:
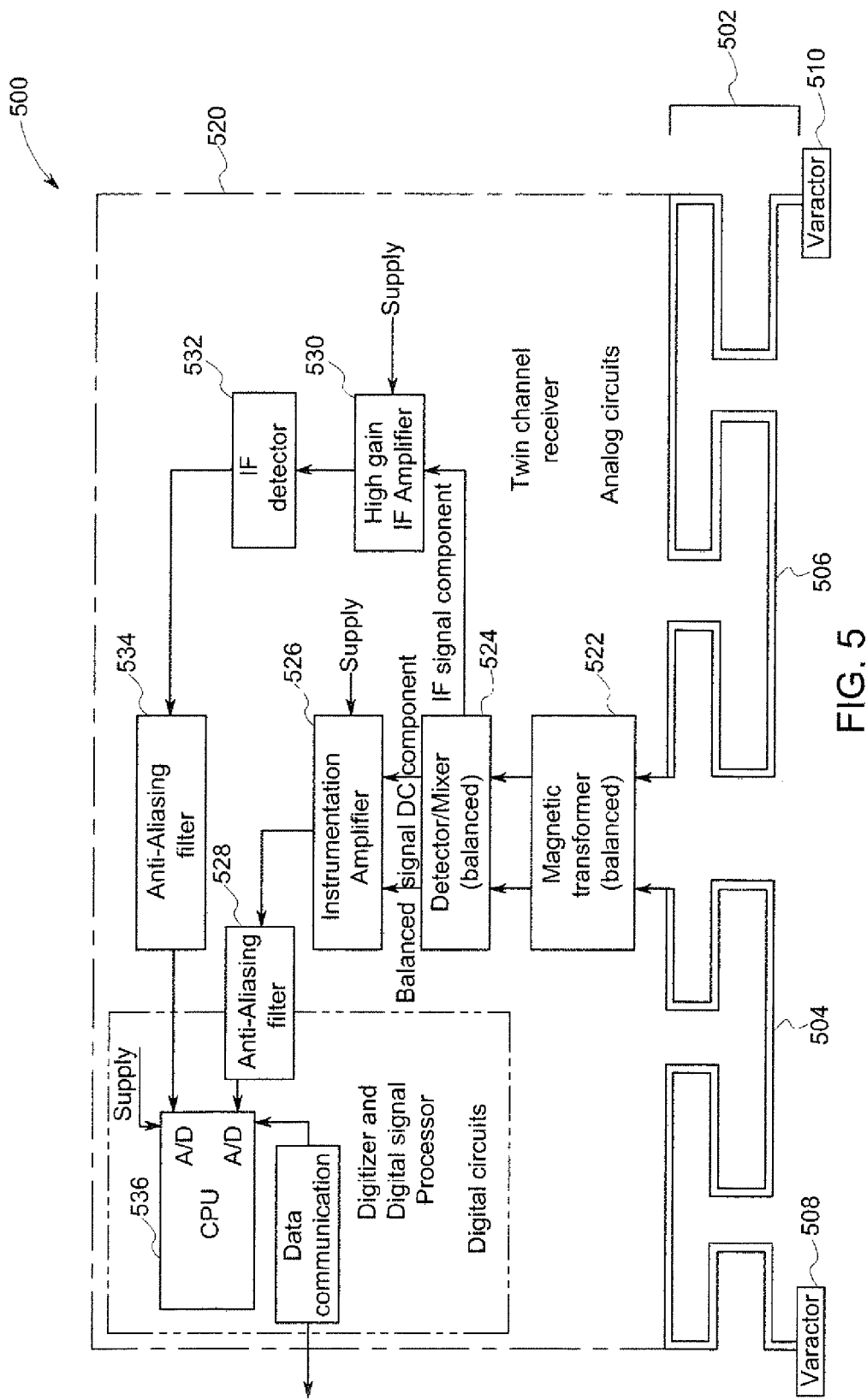
FIG. 5 is a schematic diagram of a vehicle positioning system, according to an embodiment.

In various embodiments, a first resonant short dipole antenna may be used as the first reception antenna 240, and a second resonant short dipole antenna may be used as the second reception antenna 250. The short dipole antennae may be substantially identical. The short dipole antennae may include fractal-shaped sections having a suitable length to perform coarse frequency tuning of antenna operation, and varactor diodes configured to perform electronic control of frequency tuning or fine tuning of antenna operation. Each resonant short dipole antenna in various embodiments may include an asymmetric pair of fractal shaped sections for reducing an amount of space required for the antennae. The dipole arms, including fractal shaped sections of the arms, may form a circuit that is balanced with respect to ground. Balanced mode circuits may receive a useful signal for further processing in a differential mode while rejecting noise from one or more receiver circuits as a common-mode signal. Further, in various embodiments, radiofrequency interfering signals are attenuated out of band, because the fractal-shaped sections of the antenna perform narrow-band filtering of received signals due to reactive loading of the short dipole arms. FIGS. 3-5 provide examples of antennae features, aspects, or characteristics that may be utilized in various embodiments. It may be noted that other types, arrangements, and/or configurations of antennae may be used in alternate embodiments.

FIG. 3 provides a schematic view of a tunable dipole antenna 300 in accordance with various embodiments. The tunable dipole antenna 300 includes a first side 302 having a first arm of the dipole, and a second side 304 having a second arm of the dipole. The tunable dipole antenna 300 also includes a microcontroller 306 operably connected to and interposed between the first side 302 and the second side 304. A signal received by the first side 302 is read at a first feeding point 312, and a signal received by the second side 304 is read at a second feeding point 322. The first side 302 includes a first fractal shape arm 314 having an appropriate effective length for receiving reflections of a transmission signal having a predetermined nominal wavelength (e.g., about 27 MHz). At least a portion of the first fractal shape arm 314 has a fractal shape or configuration. Similarly, the second side 304 includes a second fractal shape arm 324 having an appropriate effective length for receiving reflections of a transmission signal having the predetermined nominal wavelength. The first side 302 also includes a first resonant frequency tuning portion 316 operably connected to the first fractal shape arm 314 and configured to allow for fine tuning to receive reflections of an actual transmission signal wavelength (which may vary from the nominal transmission signal wavelength). Similarly, the second side 302 also includes a second resonant frequency tuning portion 326 operably connected to the second fractal shape arm 324 and configured to allow for fine tuning to receive reflections of the actual transmission signal wavelength. The first resonant frequency tuning portion 316 (as well as the second resonant frequency tuning portion 326) may include one or more varactor diodes configured for electronic control of frequency tunability of the tunable dipole antenna 300. Thus, coarse tuning of an antenna may be achieved by selecting an appropriate length for a reactive loading circuit (e.g., fractal shaped arm). Fine tuning may be achieved by utilizing a circuit including varactor diodes, capacitors, and varying voltage to tune an antenna (e.g., the resonant frequency of the antenna). The fine tuning in various embodiments may be fixed or may be electronically controlled by a microcontroller.

FIG. 4 provides a circuit diagram of a tunable fractal short dipole antenna 400 in accordance with variance embodiments. In various embodiments, a tunable fractal short dipole antenna may be used in conjunction with a half-bridge diode circuit that may act, at the same time, as a homodyne direct detector of a carrier signal (e.g., reflections 280) and as a homodyne mixer for the detection of a modulated signal component (e.g., modulated component of reflections 280 due to modulation of the transmission signal 260). Using the arrangement of FIG. 4, an IF Signal may be produced which may be amplified and detected, for example, prior to a digitization process. The circuit includes a ground plane 404. As seen in FIG. 4, a first varactor 410 is operably (electrically) connected in series to a first fractal antenna 406 which is in turn connected in series to a first inductor 414. Similarly, a second varactor 412 is operably connected in series to a second fractal antenna 408 which is in turn connected in series to a second inductor 416. The first inductor 414 and second inductor 416 are each connected to a first branch that includes a first resistor 418, a second resistor 420, and a first capacitor 422, with the first branch operably connected to a tuning voltage 426. The first inductor 414 and the second inductor 416 are also operably connected to a second branch that includes a second capacitor 428.

As seen in FIG. 4, the second capacitor 428 is operably connected a third inductor 430 and a fourth inductor 432. The third inductor 430 is operably connected to a first diode 434 which in turn is operably connected to a branch of the circuit leading to an output voltage 442. The fourth inductor 432 is operably connected to a second diode 436 which is also operably connected to the branch of the circuit leading to the output voltage 442. The branch of the circuit leading to the output voltage 442 is further operably connected to a third resistor 438 and a second capacitor 440 that are arranged in parallel to each other. It may be noted that the particular components and arrangement shown in FIG. 4 are provided by way of example for illustrative purposes, and that additional or different components may be utilized in alternate embodiments. The placement, sizes, and characteristics of particular components may be selected for a particular application.

As may be understood from FIG. 4, a fractal short dipole antenna (e.g., first reception antenna 240 or second reception antenna 250) may include two anti-symmetrical dipole arm sections (e.g., fractal shaped arm sections). The dipole antenna may also include two tuning varactor diodes (which may be identical), with each tuning varactor diode connected to ground at or near a tip or edge of a corresponding fractal shaped arm section. Further still, a balanced impedance transformer (magnetic transformer) may be provided by inductance sections (e.g, first inductor 414, second inductor 416) connected to a balanced half-bridge diode circuit configured to act as a detector and/or mixer. A common cathode signal may be low-pass filtered by the third resistor 438 and the second capacitor 440 before being transmitted for further processing and/or analysis.

As indicated above, the transmission signal 260 may be modulated. For example, the transmission signal 260 may be transmitted with a power level (e.g., about 20 Watts) that is stronger than other proximate signals. For example, spectral components produced by modulation of the transmission signal 260 may be filtered, amplified, and utilized to confirm that a received signal corresponds to an echo or reflection of the transmission signal. FIG. 5 provides a schematic view of an antenna system 500 that may be used to receive, filter, and identify a modulated signal, formed in accordance with various embodiments. It may be noted that FIG. 5, as well as FIGS. 3-4, corresponds to a single dipole antenna configured to receive reflections or echoes (e.g., reflections 280) of a transmission signal (e.g., transmission signal 260). One or more additional dipole antennae may be utilized and coupled to processing circuitry for comparing characteristics (e.g., amplitude) of plural received reflection signals received at different positions along a vehicle. It may further be noted that one or more aspects of processing circuitry may be shared between reception antennae. Further still in various embodiments, processing circuitry (e.g., filters, amplifiers, mixers, or the like) may be disposed in a common unit with an antenna and/or disposed in a separate processing unit operably connected to the antenna.

The antenna system 500 includes a fractal short dipole antenna 502 operably connected to a processing and analysis unit 520. The fractal short dipole antenna 502 includes a first arm 504 and a second arm 506. The first arm 504 is operably connected to a first varactor 508 configured for tuning to a frequency corresponding to a transmitted signal (e.g., transmission signal 260). The second arm 506 is operably connected to a second varactor 510 configured for tuning to a frequency corresponding to the transmitted signal. The fractal short dipole antenna 502 is operably connected to the processing and analysis unit 520, and information or signals received from each of the first arm 504 and the second arm 506 are transmitted to the processing and analysis unit 520. The processing and analysis unit 520 receives and processes the received signals information. In the illustrated embodiment, the processing and analysis unit 520 includes a transformer 522, a detector/mixer 524, an amplifier 526, a filter 528, an IF amplifier 530, an IF detector 532, a filter 534, and a central processing unit 536.

In the illustrated embodiment, the transformer 522 is configured to receive information or signals from the first arm 504 and the second arm 506 as inputs to separate channels. The transformer 522 may be configured as a magnetic transformer. In the illustrated embodiment, the transformer 522, responsive to receiving the inputs from the first arm 504 and the second 506, provides an output to the detector/mixer 524. The detector/mixer 524 is configured to receive the output from the transformer 522, and to provide two distinct outputs. The first output corresponds to a balanced signal DC component (e.g., carrier component) and is provided to the amplifier 526. The second output corresponds to an IF signal component (modulated component) and is output to the IF amplifier 530.

The DC component is output from the detector/mixer 524 to the amplifier 528. The amplifier 528 may receive power from a supply and be configured as an instrumentation amplifier. The amplifier 528 amplifies the received DC component and provides an output to the filter 530. The filter 530, configured as an anti-aliasing filter in the illustrated embodiment, receives an input from the amplifier 528, and after filtering, provides an output to the central processing unit 536. Thus, a slowly varying time-variable component (corresponding to the carrier component of a modulated signal) output by the detector/mixer 524 may be sent to a low-noise instrumentation amplifier and, after an anti-aliasing low pass filtering, be digitized and processed by the CPU 536.

The IF component is received by the IF amplifier 530, which is configured as a high gain amplifier in the illustrated embodiment. The output of the IF amplifier 530 is provided to the IF detector 532, which is configured to detect the IF signal and/or confirm that the IF signal corresponds to the modulation of the transmitted signal 260, and to provide an output to the filter 534. The filter 534 in the illustrated embodiment is configured as an anti-aliasing filter, and provides an output to the CPU 536. Thus, an IF component corresponding to the modulation of the transmission signal 260 may be sent to a high gain amplifier and further processed by a highly selective (e.g., narrow band) IF amplifier followed by an IF detector. After low pass anti-aliasing filtering, the output may be digitized and processed by the CPUT 536.

The CPU 536 may include analog to digital (A/D) converters to digitize information received from the filter 528 and the filter 534. The CPU 536 may further process and/or analyze the received information. For example, the CPU 536 may be configured to confirm that the received information corresponds to reflections of the transmission signal 260, for example based on the modulation of the received signal. As another example, the CPU 536 may compare the amplitudes of signal received by the fractal short dipole antenna 520 and a second antenna (not shown in FIG. 5) to determine the location of the vehicle 202. The CPU 536 may also be configured to output information for further processing, analysis, or display.

For example, the CPU 536 may be configured to perform averaging of digitized samples of signal, de-noising, and/or digital signal conditioning. A digital correlation (e.g., AND type) of the DC and RF components may be performed. Digital results of the signal processing may be transmitted by the CPU 536 through a data communication port, and used to compare the amplitude of signals received by two or more antennae to provide an accurate, reliable, and cost-effective detection of position of the vehicle 202 with respect to the target 210 in real-time. It may be noted that various aspect of FIGS. 3-5 may be split or shared between an antenna unit and the processing unit 212 in various embodiments. Returning to FIG. 2, further details of the processing of received information according to an example embodiment is discussed below in connection with the processing unit 212.

As seen in FIG. 2, the processing unit 212 of the illustrated embodiment includes a comparison module 214, an identification module 216, and a memory 218. The memory 218 may be accessed by and utilized by one or more other portions or aspects of the processing unit 212. Further, the memory 218 may include one or more databases or tables including an identification of particular targets and the positions or locations of the targets along the route 204, for example in an order in which the targets are expected to be encountered by the vehicle 202 during performance of a mission or portion of a mission. The processing unit 212 may be communicably coupled with control systems of the vehicle 202 to update or provide information regarding position of the vehicle to the one or more additional systems, and/or to receive information from the one or more additional systems. For example, the processing unit 212 may receive speed information describing the speed of the vehicle 202 over a relevant time period that may be used to determine the position of the vehicle 202 for a period of time after the vehicle 202 has passed over the target 210. The processing unit 212 may be configured to perform filtering and/or other processing of received signals to confirm that the received signals correspond to reflections of the transmission signal 260 off of the target 210 (e.g., based on modulation). Generally, in various embodiments, the processing unit 212 is configured to receive reception information from the reception antennae, to compare the reception information received from a first antenna (e.g., first reception antenna 240) to reception information received from a second antenna (e.g., second reception antenna 250), and to determine a position of the vehicle 202 using the comparison of the reception information from the first and second antennae.

Generally, in various embodiments, the processing unit 212 may be understood as a processing circuitry module and may include processing circuitry such as one or more field programmable gate array (FPGA), application specific integrated circuit (ASIC), or microprocessor. The processing unit 212 (or module, aspect, or portion thereof) may include one or more aspects of circuitry described herein, for example in FIGS. 4 and/or 5. The processing unit 212 in various embodiments may be configured to execute one or more algorithms to perform functions or operations described herein. The one or more algorithms may include aspects of embodiments disclosed herein, whether or not expressly identified in a flowchart or as a step of a method.

The detected comparison module 214 is configured to receive information from the first reception antenna 240 and the second reception antenna 250, and to perform one or more analyses or comparisons of the information. For example, the comparison module 214 may compare amplitudes of signals received by the first reception antenna 240 and the second reception antenna 250. It may be noted that the comparison module 214 may be configured to filter and process information received from the reception antennae (e.g., to identify the amplitude of signals received by each of the reception antennae) and/or may receive information that has already been filtered and/or processed by one or more other aspects of the processing unit 212. The comparison module 214 may further be configured to compare carrier and IF components of received signals to confirm or verify that the components correlate to the transmission signal 260.

In the illustrated embodiment, the identification module 216 is configured to receive comparison information from the comparison module, and to identify a time at which the vehicle 202 passes over the target 210 based on the received comparison information. For example, the comparison module 214 may compare the amplitude of a signal received by the first reception antennae 240 to the amplitude of a signal received by the second reception antennae 250, and provide the results of the comparison (e.g., comparisons between the amplitudes at different points in time as the vehicle 202 approaches, passes over, and passes by the target 210), and the identification module 216 may identify a peak in the difference between the amplitudes based on the comparison. In the illustrated embodiment, the time at which the peak in the difference occurs may be identified by identification module 216 as the time at which the reference point 281 passes directly over the target 210. Thus, by knowing the location or position of the target 210 (e.g., from information in the uplink signal 270 and/or information from a database cataloguing the positions of the targets 210 along the route 240 during a mission), the position of a given portion of the vehicle 202 (e.g., front of the vehicle, rear of the vehicle, door of the vehicle) may be determined by adjusting for the time elapsed since the reference point 281 passed over the target 210 as well as by the distance from the reference point 281 to the given portion of the vehicle. In other embodiments, other relationships between amplitudes or other aspects of received reflection signals may be employed, and/or other reference points (e.g., corresponding to different placements of antennae) may be employed in receiving signals and/or determining position.

Further still, the identification module 216 may be configured to confirm or check a position determined based upon a comparison of received reflection signals. For example, the identification module 216 (or other aspect of the processing unit 212) may receive information from the uplink antenna 212. Based on a relative strength of a signal received from the uplink antenna 236, the identification module 216 may identify a time at which the vehicle 202 passes over the target 210. The identification module 216 may then compare the position of the vehicle 202 (and/or time passing over the target 210) determined using the reflections of the transmission signal 260 with the position of the vehicle 202 (and/or time passing over the target 210) determined using the strength of the uplink signal 270. While the position obtained via the reflected signals may be expected to be more accurate, the position obtained using the strength of the uplink signal 270 may be used as a check. If the positions are within a predetermined range of each other, the position determined using the reflections may be considered verified, and used to determine the position of the vehicle 202 as the vehicle travels along the route 204 (e.g., until the vehicle 202 passes over a subsequent target 210). If the values do not compare, then, in some embodiments, additional analysis may be performed to verify the position and/or identify the cause or reason for discrepancy.

The identification module 216 may also be configured to identify broken, damaged, or otherwise malfunctioning targets 210. For example, if the target 210 is configured to transmit an uplink signal but fails to do so, the target 210 may be identified as broken or damaged. In one example scenario, the vehicle 202 approaches an expected target 210. The target 210 may be expected, for example, based upon a previously known position of the vehicle 202, a time elapsed and speed of the vehicle 202 since the previously known position, and identified positions of targets 210 in a database accessible by the vehicle 202. As the vehicle approaches and passes the target 210, the transmission signal 260 is sent, and reflections 280 off of the target 210 received by the vehicle 202 are used to determine a time when the reference point 210 passes over the target 210. However, because the target 210 is damaged, the uplink signal 270 may not be sent, or may be sent at a relatively low amplitude below a threshold, design, or otherwise desired value of amplitude. The identification module 216 may then identify the failure to receive the uplink signal 270, or reception of an improperly configured uplink signal 270, and identify the particular target 210 passed over (e.g., using information identifying the expected targets 210 along the route 204 during a mission) as a broken or damaged target. A message may then be sent to a maintenance system to inspect, repair, or replace the identified target.

Figure 6:
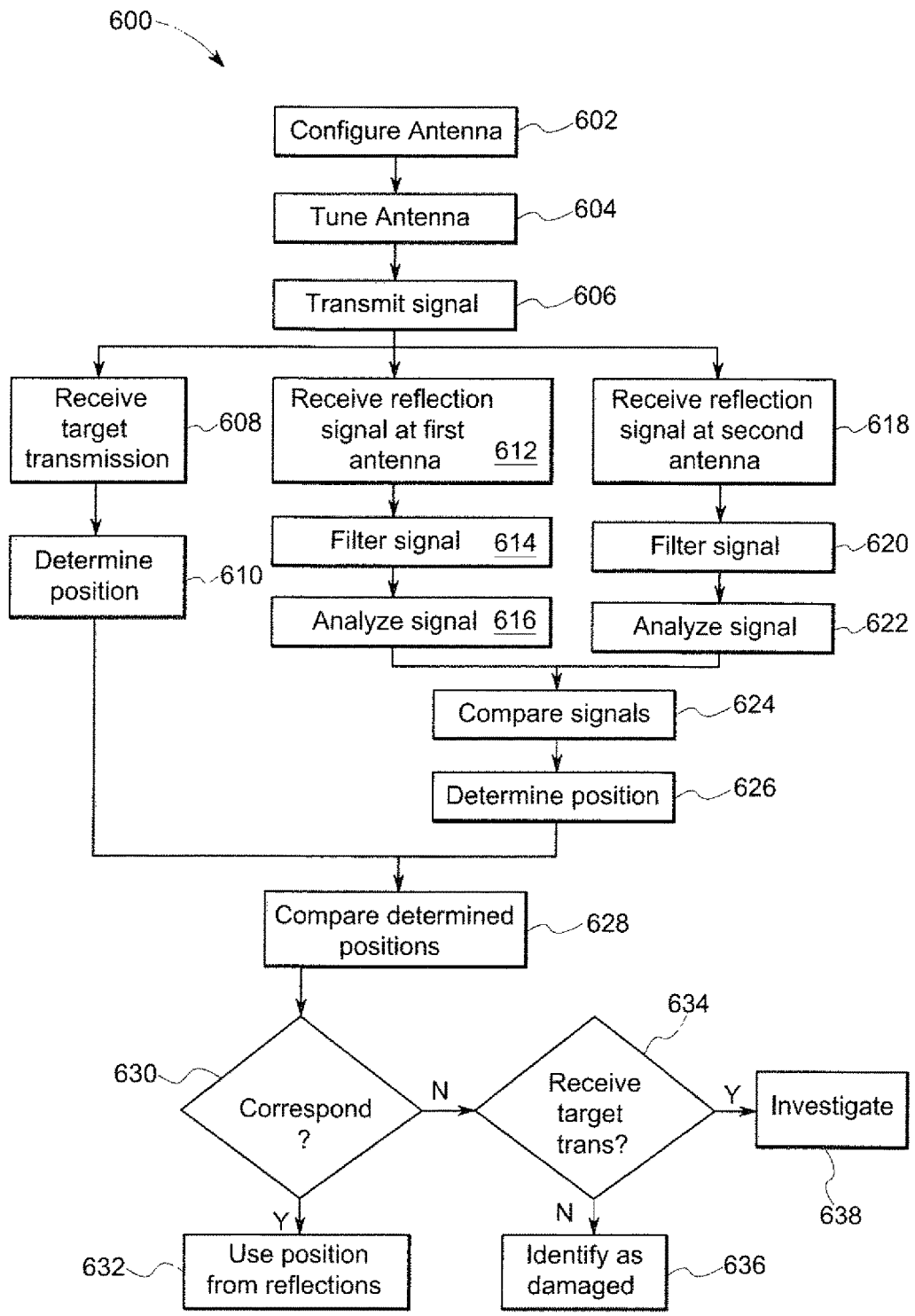
FIG. 6 is a flowchart of a method for vehicle positioning, according to an embodiment.

FIG. 6 illustrates a flowchart of a method 600 for determining position of a vehicle in accordance with one embodiment. The vehicle may pass over or by one or more targets disposed along a route during performance of a mission or a portion of a mission. The method 600 may be performed, for example, using certain components, equipment, structures, or other aspects of embodiments discussed herein. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method 600 may be able to be used as one or more algorithms to direct hardware to perform operations described herein.

At 602, an antenna (e.g., an antenna configured to receive reflections of a transmission signal off of a target) is configured. For example, the antenna may include a tunable dipole antenna having arms with at least a portion of the arms having a fractal shape. Based on a nominal value of an expected transmission signal, the size and shape of the arms (e.g., an effective length) may be determined. The size and shape may also be selected to fit within a space restriction of the vehicle. The antenna may be configured to be disposed on the underside of the vehicle at a predetermined location in a predetermined spatial relationship with a similarly configured antenna. The spatial relationship of the antennae configured to receive signals reflected off of the target may be used to determine a reference point. The position of the vehicle may be determined based on a determined time at which the reference point passes over the target.

At 604, the antenna is tuned. For example, the antenna (as well as any other antenna configured to receive the reflected signals) may be tuned to an actual frequency of a transmitted signal. The configuration of the antenna at 602 may be understood as a coarse tuning, while the tuning at 604 may be understood as a fine tuning. The antenna or associated hardware may include one or more varactors configured to allow the fine tuning. The fine tuning may be done before the vehicle departs on a mission, or may be performed and/or adjusted as the vehicle traverses the route performing the mission.

At 606, a signal is transmitted. The signal transmitted at 606 may be understood as a location signal. Generally, the signal is configured so that echoes or reflections of the signal off of the target may be received, identified, and used to determine the position of the vehicle. The signal may be relatively strong relative to any other signals expected to be encountered proximate the target. For example, the transmission signal may be transmitted at about 20 Watts from a transmission antenna disposed onboard the vehicle. In some embodiments, the signal may be transmitted at a frequency of about 27 MHz. To help with identification of reflections of the signal and discerning the reflections from other signals (noise), the transmitted signal may be modulated (e.g., the signal may include a modulate component imposed upon a carrier component, with the modulated component used to identify the signal). Further, in some embodiments, the signal transmitted at 606 may be configured as a telepowering signal that provides power as well as activates the target, with the target transmitting an uplink signal to the vehicle responsive to reception of the telepowering signal by the target. The transmitted signal may also include information transmitted to the target from the vehicle.

At 608 a transmission (e.g., uplink message) from the target is received, for example by an uplink reception antenna disposed on the underside of the vehicle. For example, the transmission from the target may be sent responsive to receipt of the signal sent at 606. The transmission from the target or uplink message may include information regarding the location of the target, route conditions proximate the target (e.g., speed limits), or the like. The transmission from the target may be transmitted at a frequency substantially different than the signal transmitted at 606. In some embodiments, the transmission from the target may have a frequency of about 4.25 MHz. It may be noted that in some embodiments, one or more targets may not be configured to transmit an uplink message or signal.

At 610, the position of the vehicle is determined using the transmission from the target. For example, a relative strength of a signal received from the target may be analyzed (e.g., by one or more processing units disposed on the vehicle and operably coupled to the uplink reception antenna) and used to identify a time when the vehicle passes over the target. The position of the vehicle may be determined based on a time elapsed and speed during the time period elapsed since the vehicle passed over the target. This determined time and/or position may be used as a check or confirmation for a time and/or position determined using reflections of the transmission signal (sent at 606).

At 612, a reflected signal or signals of the transmission signal reflected off of the target is received at a first reception antenna disposed on the underside of the vehicle. It may be noted that the first reception antenna, as well as other antennae discussed in connection with FIG. 6, may be described herein as being on the underside of the vehicle. Such a positioning may be used, for example, where the vehicle is a rail vehicle (e.g., train) and the target is disposed between rails of a track traversed by the rail vehicle. In other embodiments, however, the target and/or antennae may be otherwise disposed with respect to the vehicle and/or route. For example, antennae may be disposed proximate an upper surface of the vehicle, and the target may be disposed above the route. As another example, antennae may be disposed on a side of a vehicle. In various embodiments, the first reception antenna may be configured as a short dipole antenna with at least a portion of the arms configured in fractal shapes, for example, to conserve space. The first reception antenna may be configured and tuned as discussed above in connection with 602 and 604. Generally similarly, a reflected signal or signals of the transmission signal may also be received via a second reception antenna (e.g., an antenna configured generally similarly to the first reception antenna) at 618 at or near the same time as the reflected signal or signals is received by the first reception antenna. The first reception antenna and the second reception antenna may be placed in a predetermined spatial relationship and define a reference point. For example, the first and second reception antenna may be disposed along a generally straight line on either side of an antenna used to transmit the signal at 606, with the reference point defined as a midpoint equidistant between the first and second reception signals.

At 614, the reflected signal received at 612 is filtered and/or otherwise processed. For example, the signal may be filtered to remove noise, amplified, or the like. The signal may be separated into carrier and modulated components during the filtering or other processing at 614. Generally similarly, the reflected signal received at 618 may be filtered and/or otherwise processed at 620.

At 616, the reflected signal received at 612, after filtering and/or processing at 614, is analyzed. For example, carrier and modulated components may be analyzed to confirm that the received signal corresponds to the signal transmitted at 602. If the received signal does not correspond based on the modulation, the received signal may be identified as noise and disregarded. The reflected signal may also be analyzed to identify one or more properties of the received signal, such as the amplitude of the received signal at various times as the vehicle approaches and passes over the target. Generally similarly, the reflected signal received at 618, after filtering and/or processing at 620, may be analyzed at 622.

At 624, the signals analyzed at 616 and 622, respectively, are compared. One or more properties or characteristics of the received signals may be compared, for example over a time period corresponding to the passage of the vehicle over the target. For example, the amplitudes of the received signals may be compared over the time period. It may be noted that one or more aspects of the filtering, processing, comparing, analyzing, or the like of received signals may be performed by one or more processing units (e.g., processing circuitry units) disposed onboard the vehicle and operably connected to the various antennae.

At 626, the position of the vehicle is determined based on the comparison at 624. For example, in the illustrated embodiment, a peak in the difference between the amplitudes of the signals received at 612 and 618 may be used to determine the position of the vehicle. The time at which the peak in difference of the amplitudes of the received reflection signals occurs may be identified as the time at which the reference point of the vehicle passed over the target. The position of the vehicle at a given time may be determined based on the difference between time the reference point passed over the target and the time at which the position of the vehicle is desired. For example, the uplink signal (e.g., signal received at 608) may include information describing a geographical position of the target, or otherwise identifying the target. Alternatively or additionally, the vehicle may include or have access to a database listing targets expected to be encountered along the route, along with geographic or other positions (e.g., mile or other distance marker along a route) of the targets. Using the known position of the target, the elapsed time since passage of the reference point over the target, and the speed of the vehicle during the elapsed time, the position of the reference point at a given time may be determined. To determine the position of a different portion of the vehicle, the distance from the reference point to the given portion of the vehicle may be used to adjust the determined reference point position.

At 628, for embodiments in which the target is configured to transmit an uplink signal, the positions determined at 610 (using the strength of the uplink signal) and at 626 (using received reflections of the location signal transmitted at 606) are compared. Alternatively or additionally, times describing passage of the reference point of the vehicle determined using the uplink message and using the reflections may be compared.

At 630, it is determined if the positions (and/or times) compared at 628 correspond. For example, the positions may be determined to correspond if the positions (and/or times) are within a threshold range of each other, the positions (and/or times) may be determined to correspond to each other.

If the positions (and/or times) correspond, the position determined using the reflections at 626 may be considered confirmed and used to identify the position of the vehicle at 632. The time of passage over the reference point as determined using the reflections may also be used to determine future position of the vehicle based on the speed of the vehicle over the elapsed time since the time of passage of the vehicle. In some embodiments, the time of passage determined at 626 may be used to determine future or subsequent positions until a subsequent target is encountered, at which point a position determination based on the subsequent target may be used. It may also be noted that, even if the determined positions do not correspond, the time or position determined using the reflections may still be used in various embodiments. For example, if the determined position is within a predetermined range of an expected position based on mission parameters (e.g., time of departure and average speed), the position may considered as confirmed and used.

If the positions (and/or times) do not correspond, it is determined if the target transmission of 608 has been received. If the target transmission was not received (or was received in a damaged condition, e.g., with an amplitude below a threshold value, corrupted, or otherwise deviating from an expected condition or configuration), the target may be identified as damaged at 636. Targets identified as damaged may be flagged for further inspection, repair or replacement. If the target transmission was received (e.g., received in an acceptable or usable condition), further investigation may be performed at 638 to identify a cause or reason for the discrepancy. For example, the determined positions may be compared to an expected position based on mission parameters to determine if one or both determined positions appear incorrect or inconsistent.

As indicated herein, one or more steps of the methods or one or more aspects of the systems (or components thereof) disclosed herein may be omitted, revised, augmented, or the like. For example, in various embodiments, the signals received by the first and second reception antennae (the antennae receiving reflected signals) may be compared before one or more processing steps, with a combined, mixed, or subtracted signal further processed after the received signals (or aspects thereof are compared). In various embodiments, signals from the first and second reception antennae may be compared by subtracting one of the signals from the other of the signals at a component such as a transformer that obtains the signals received by the first reception antenna and the second reception antenna as separate inputs. The subtraction of the signals received by the first and second reception antennae may be performed directly as radiofrequency signals, thereby maintaining reference of their amplitude and phase during subtraction. Maintaining reference to the amplitude and phase during subtraction in various embodiments minimizes or reduces any impairment (e.g., due to electronic noise) and/or maximizes or increases detection sensitivity.

Figure 7:
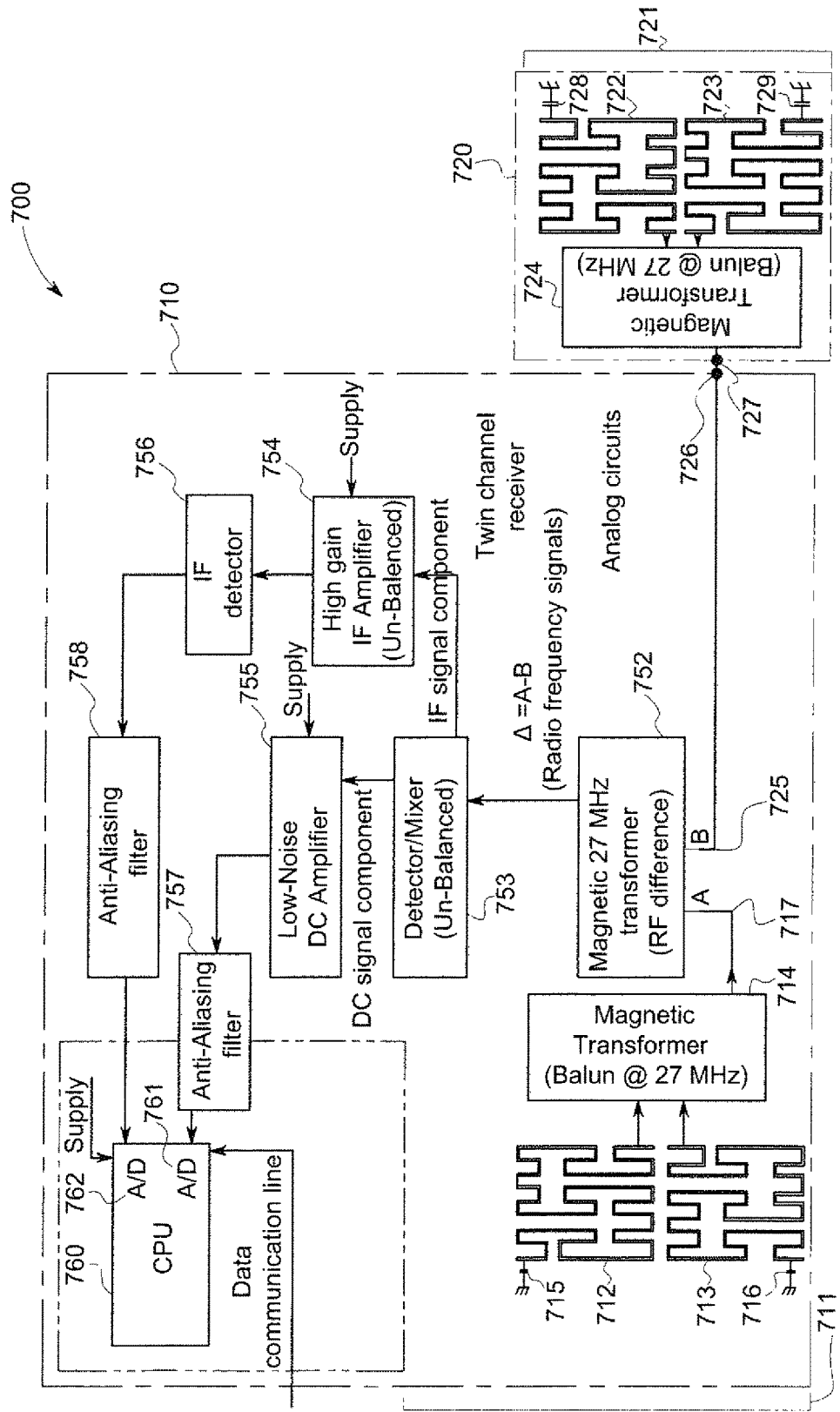
FIG. 7 is a schematic diagram of a vehicle positioning system, according to an embodiment.

FIG. 7 provides a schematic view of a vehicle positioning system 700 that may be used to receive, filter, and identify a modulated signal, formed in accordance with various embodiments. In contrast to the system depicted in FIG. 5 (which corresponded to a single dipole antenna), the system 700 depicted in FIG. 7 corresponds to two dipole antennae configured to receive reflections or echoes (e.g., reflections 280) of a transmission signal (e.g., transmission signal 260). The two diploe antennae of the system 700 may be configured in what is referred to as a "master and slave" arrangement. The system 700 is configured to directly subtract signals from first and second reception antennae as radiofrequency signals. Thus, the system 700 may be understood as subtracting before detection, in contrast to the system 500 which may be understood as detecting before subtraction. When the signals are first detected and then subtracted, information about coherence and phase of the signals may be destroyed or lost during a detection process over separate channels, which may allow electronic noise to have a more pronounced effect than if the signals are preliminarily subtracted, as provided for by the system 700.

It may be noted that, in principle, the relatively low geometric distances between the first and second reception antennae, in various embodiments, may be small enough with respect to radiofrequency wavelength that phase variations of signals may be negligible (e.g., a few tenths of a degree). However, phase coherent processing of signals may be used to improve detection performance or help preserve detection performance from degradation due to electronic noise present in a system. Thus, in embodiments, direct subtraction may allow utilization of information regarding signal coherence of phase to minimize or reduce the impairment effect of electronic noise in a detection system, thereby improving detection sensitivity.

The system 700 includes a first portion 710 (or master unit or portion) and a second unit 720 (or slave unit or portion). The second (or slave) portion 720 includes a fractal short dipole antenna 721. The first (or master) portion 710 includes a fractal short dipole antenna 711, as well as additional components for conditioning and/or processing of signals.

In the illustrated embodiment, the second portion 720 includes a fractal short dipole antenna 721 that in turn includes a first arm 722 and a second arm 723. The second portion 720 also includes a magnetic transformer 724 that receives input from the first arm 722 and the second arm 723, and is in turn operably connected to the first portion 710 via a coaxial cable 725 and coaxial connecters 726, 727. The magnetic transformer 724 may receive an unbalanced output of the antenna arms (see FIG. 9 for further details). The second portion 720 also includes capacitors 728, 729. Tuning of the fractal short dipole antenna 721 may be achieved with varactor diodes including bias tuning circuitry. Fine tuning may be omitted in certain embodiments, with fixed capacitors employed.

The depicted first portion 710 (or master portion) includes a fractal short dipole antenna 711 that in turn includes a first arm 712 and a second arm 713. The first portion 710 also includes a magnetic transformer 714 that receives input from the first arm 712 and the second arm 713. The magnetic transformer 714 may receive an unbalanced output of the antenna arms (see FIG. 9 for further details). The first portion 710 also includes tuning capacitors 715, 716 configured for fine tuning of the fractal short dipole antenna 711.

Further, the first portion 710 of the illustrated embodiment includes a magnetic transformer 752, which receives an input "A" from the magnetic transformer 714 of the first portion 710 via a coaxial cable 717, and an input "B" from the magnetic transformer 724 of the second portion 720 via the coaxial cable 725. The transformer 752 outputs a Δ that corresponds to a difference between a signal received by the fractal short dipole antenna 711 of the first portion 710 and the fractal short dipole antenna 721 of the second portion 720 (e.g., "A"-"B"). The transformer 752 thus performs a coherent differencing of radiofrequency signals received by the two antennae. Therefore, phase and amplitude coherence of received signals may be preserved in the subtraction, and may help minimize or reduce noise or chaotic misleading effects of electronic noise during the detection process.

The transformer 752 provides an output a detector/mixer 753, which may be configured as an un-balanced detector/mixer. The detector/mixer 753 has a split output, providing a first output of a low frequency component sent to a low noise DC amplifier 755, and a second output of an IF signal component sent to a high gain IF amplifier 754. Thus, independent components of frequency are amplified and then filtered by the first anti-aliasing circuit 757 and the second anti-aliasing circuit 758, before digital conversion by the first a/d converter 761 and the second a/d converter 762, and further processing by the CPU 760. The output of the IF amplifier 754 in the illustrated embodiment is provided to an IF detector 756 configured to detect an IF signal before filtering and digitization.

Figure 8:
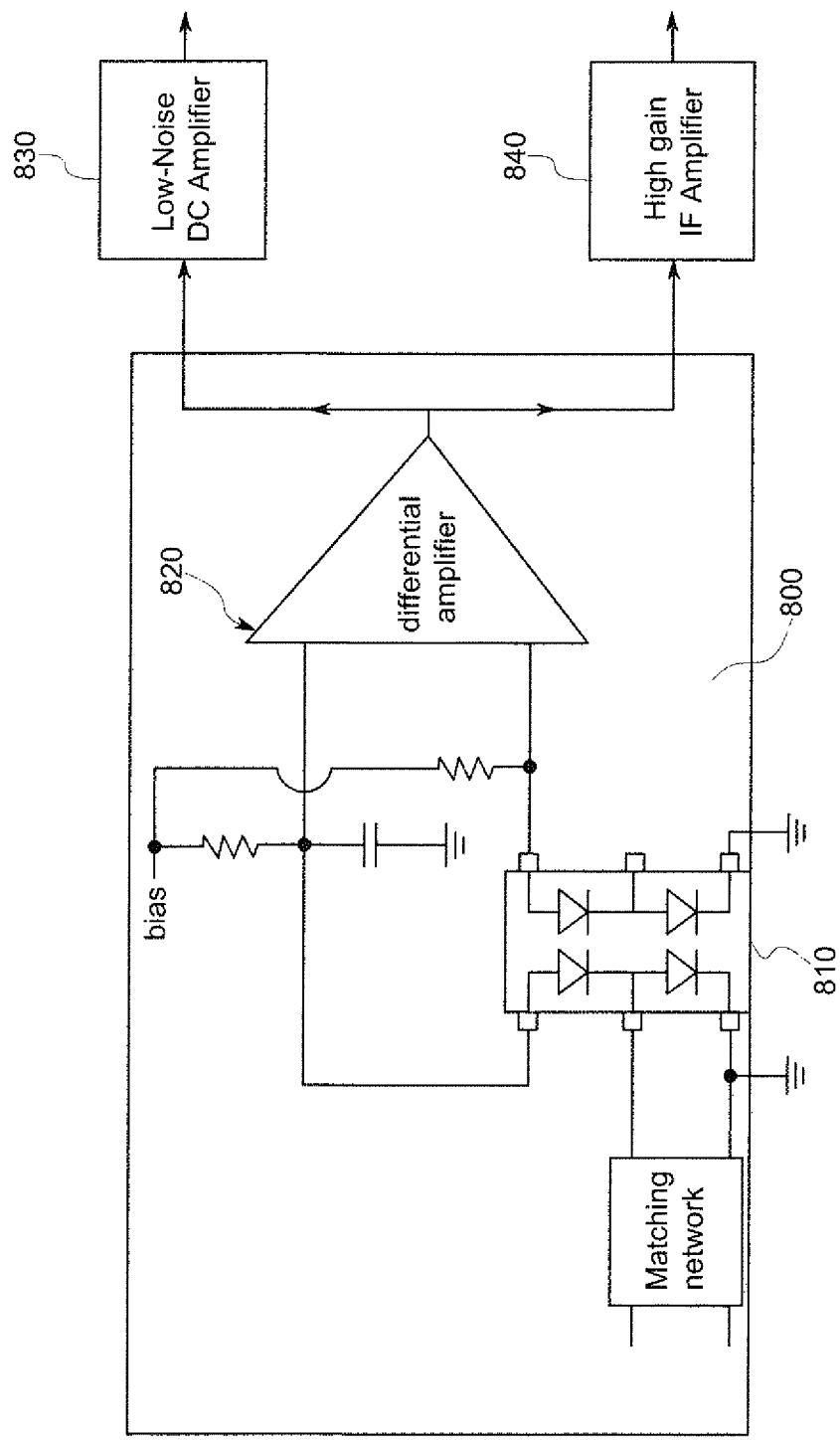
FIG. 8 is a schematic diagram of a detector/mixer circuit, according to an embodiment.

FIG. 8 illustrates a circuit diagram of a detector/mixer 800 formed in accordance with various embodiments. For example, the detector/mixer 800 may be employed as the detector/mixer 753 in the system 700. The detector/mixer 800 includes a full-bridge 4-diode circuit 810 followed by a wide-band amplifier 820. The detector/mixer 800 is operably connected to a low-noise DC amplifier 830 and a high gain IF amplifier 840. The detector/mixer 800 is configured to provide a slowly varying DC signal component of coherent interferometric difference associated with a carrier component of a received signal to the low-noise DC amplifier 830. The detector/mixer 800 also provides an IF component corresponding to modulation to the high gain IF amplifier 840. In various embodiments, the detector/mixer 800 is configured to act as a Homodyne direct detector of a carrier component and as a Homodyne mixer for a modulated component. The detector/mixer 800 thus produces an IF signal that may be narrow band amplified (e.g., by the amplifier 754) and detected again using a base-band detector (e.g., IF detector 756).

Figure 9:
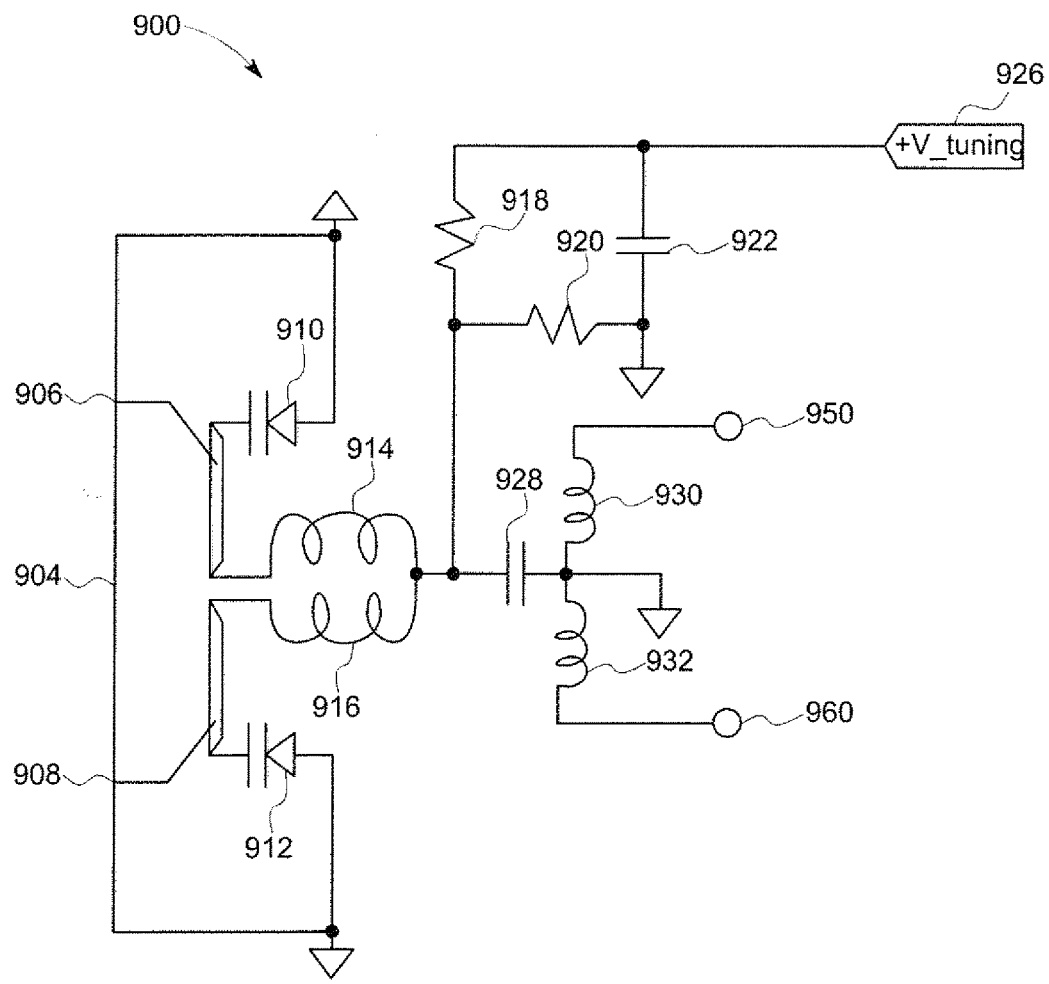
FIG. 9 is a schematic diagram of a tunable fractal short dipole antenna circuit, according to an embodiment.

FIG. 9 provides a circuit diagram of a tunable fractal short dipole antenna 900 in accordance with variance embodiments. The antenna 900 is configured to provide an unbalanced output, and, further, may also provide a balanced output. The antenna 900 may be similar in certain respects to the antenna 400 discussed above in connection with FIG. 4. For example, the circuit includes a ground plane 904. Further, a first varactor 910 is operably (electrically) connected in series to a first fractal antenna 906 which is in turn connected in series to a first inductor 914. Also, a second varactor 912 is operably connected in series to a second fractal antenna 908 which is in turn connected in series to a second inductor 916. The first inductor 914 and second inductor 916 are each connected to a first branch that includes a first resistor 918, a second resistor 920, and a first capacitor 922, with the first branch operably connected to a tuning voltage 926. The first inductor 914 and the second inductor 916 are also operably connected to a second branch that includes a second capacitor 928.

The second capacitor 928 is in turn operably connected a third inductor 930 and a fourth inductor 932. In the embodiment depicted in FIG. 9, the third inductor 930 is operably connected to an unbalanced output 950, and the fourth inductor 932 is operably connected to a balanced output 960. The unbalanced output 950, for example, may be used to provide an input to a magnetic transformer (e.g., transformer 708, transformer 709). It may be noted that the particular components and arrangement shown in FIG. 9 are provided by way of example for illustrative purposes, and that additional or different components may be utilized in alternate embodiments. The placement, sizes, and characteristics of particular components may be selected for a particular application.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

Embodiments may also include computer readable media with instructions that are configured to direct a processor to execute or perform the various method operations described herein. Embodiments may also include powered vehicles including the various modules and/or components of vehicle networks described herein. Moreover, embodiments described herein may include vehicle consists that include the various modules and/or components, the vehicle networks, or the system networks described herein.

In one embodiment, a system is provided including a transmission unit, a first reception antenna, a second reception antenna, and a processing unit. The transmission unit is configured to be disposed onboard a vehicle traversing a route. The transmission unit includes a transmission antenna and is configured to transmit a location signal to a target disposed along the route as the vehicle traverses the route. The first reception antenna is configured to receive at least one reflection signal of the location signal reflected off the target. The second reception antenna is configured to receive the at least one reflection signal reflected off the target. The processing unit is operably connected to the first reception antenna and the second reception antenna and is configured to obtain first reception information from the first reception antenna and second reception information from the second reception antenna, perform a comparison of the first and second reception information, and determine a position of at least one of the vehicle or the target using the comparison of the first and second reception information.

In another aspect, the first and second reception antennae are configured as fractal short dipole antennae configured to receive a predetermined wavelength corresponding to the location signal. The first and second reception antennae are configured to be fine-tunable to an actual wavelength of the location signal.

In another aspect, the comparison includes a comparison of a first amplitude of the first reception information and a second amplitude of the second reception information. A peak in a difference between the first amplitude and the second amplitude is used to determine a location of the vehicle relative to the target.

In another aspect, the transmission unit is configured to transmit the location signal including a carrier component and a modulated component.

In another aspect, at least one of the first or second reception antenna comprises a full bridge diode circuit configured to act as a detector to detect a carrier component of a reflected signal and to act as a mixer to detect a modulated component of the reflected signal.

In another aspect, the processing unit is configured to determine if the carrier component of the received signal and the modulated component of the received signal correlate to each other. The processing unit may also be configured to identify the received signal as a reflection of the location signal if the carrier portion and the modulated portion of the received signal correlate to each other.

In another aspect, the target is configured as a balise and the transmission unit comprises a third reception antenna configured to receive an uplink signal from the balise. The processing unit is configured to compare information from the uplink signal with the determined position.

In another aspect, the target is configured as a balise and the transmission unit comprises a third reception antenna configured to receive an uplink signal from the balise. The processing unit is configured to determine if the target is functioning properly based on whether or not the uplink signal is received.

In an embodiment, a method (e.g., method for determining the position of at least one of a vehicle traversing a route or a target) includes transmitting, from a transmission unit including a transmission antenna disposed onboard the vehicle, a location signal to a target disposed along the route as the vehicle traverses the route. The method also includes receiving, at a first reception antenna disposed onboard the vehicle, at least one reflection signal of the location signal reflected off the target. Also, the method includes receiving, at a second reception antenna disposed onboard the vehicle, the at least one reflection signal reflected off the target. Further, the method includes comparing first reception information from the first reception antenna and second reception information from the second reception antenna, and determining a position of at least one of the vehicle or the target using the comparison of the first and second reception information.

In another aspect, the first and second reception antennae are configured as fractal short dipole antennae configured to receive a predetermined wavelength corresponding to the location signal. The method further includes fine-tuning the first and second reception antennae to an actual wavelength of the location signal.

In another aspect, the comparing includes comparing a first amplitude of the first reception information and a second amplitude of the second reception information, and the determining the position of the vehicle includes using a peak in a difference between the first and second amplitude to determine a location of the vehicle relative to the target.

In another aspect, the location signal includes a carrier component and a modulated component.

In another aspect, at least one of the first or second reception antenna includes a full bridge diode circuit. The method includes using the diode circuit as a detector to detect a carrier component of a reflected signal and using the diode circuit as a mixer to detect a modulated component of the reflected signal.

In another aspect, the method includes determining if the carrier component of the received signal and the modulated component of the received signal correlate to each other, and identifying the received signal as a reflection of the location signal if the carrier component and the modulated component of the received signal correlate to each other.

In another aspect, the target is configured as a balise. The method further includes receiving an uplink signal from the balise, and comparing information from the uplink signal with the determined position.

In another aspect, the target is configured as a balise. The method further includes receiving an uplink signal from the balise, and determining if the target is functioning properly based on whether or not the uplink signal is received.

In an embodiment, a tangible and non-transitory computer readable medium is provided. The computer readable medium is configured to direct one or more processors to transmit, from a transmission unit comprising a transmission antenna disposed onboard a vehicle traversing the route, a location signal to a target disposed along the route as the vehicle traverses the route. The computer readable medium is also configured to direct one or more processors to compare first reception information from a first reception antenna and second reception information from a second reception antenna, where the first reception information corresponds to at least one reflection signal of the location signal reflected off the target received by the first reception antenna and the second reception information corresponds to the at least one reflection signal of the location signal reflected off the target received by the second reception antenna. Also, the computer readable medium is configured to direct one or more processors to determine a position of at least one of the vehicle or the target using the comparison of the first and second reception information.

In another aspect, the first and second reception antennae are configured as fractal short dipole antennae configured to receive a predetermined wavelength corresponding to the location signal. The computer readable medium is further configured to direct the one or more processors to fine-tune the first and second reception antennae to an actual wavelength of the location signal.

In another aspect, the computer readable medium is further configured to direct the one or more processors to compare a first amplitude of the first reception information and a second amplitude of the second reception information, and to determine the position of the vehicle includes using a peak in a difference between the first amplitude and the second amplitude to determine a location of the vehicle relative to the target.

In another aspect, the target is configured as a balise. The computer readable medium is further configured to direct the one or more processors to determine if the target is functioning properly based on whether or not an uplink signal from the balise is received.

Various components and modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer," "computing system," "processing system," "processing unit," or "processor" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the terms "computer," "computing system," "processing system," "processing unit," or "processor."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. The scope should, therefore, be determined with reference to the appended claims, along with the full scope of equivalents to which such claims are entitled. In the appended claims, the terms "including," "includes," and "in which" are used as the plain-English equivalents of the respective terms "comprising," "comprises," and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments, and also to enable any person skilled in the art to practice the embodiments, including making and using any devices or systems and performing any incorporated methods. The patentable scope is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the embodiments described herein, it is intended that all of the subject matter of the above description or shown in the accompanying drawings shall be interpreted merely as examples illustrating the inventive subject matter herein and shall not be construed as limiting.

The invention claimed is:

1. A vehicle comprising:
 a transmission unit disposed onboard the vehicle traversing a route, the transmission unit comprising a transmission antenna and configured to transmit, via the transmission antenna, a location signal to a balise disposed along the route as the vehicle traverses the route;
 a first reception antenna configured to receive at least one reflection signal of the location signal reflected off the balise;
 a second reception antenna configured to receive the at least one reflection signal reflected off the balise;
 a third reception antenna configured to receive an uplink signal from the balise; and
 a processing unit operably connected to the first reception antenna and the second reception antenna and configured to:
  obtain first reception information from the first reception antenna and second reception information from the second reception antenna;
  perform a comparison of a first amplitude of the first reception information and a second amplitude of the second reception information;

determine a location of the vehicle relative to the balise using a peak in a difference between the first amplitude and the second amplitudes, determine a location of the vehicle relative to the balise using the relative strength of the received uplink signal; and compare the determined locations to confirm the location of the vehicle wherein the first reception antenna and the second reception antenna are disposed on opposite sides of the transmission antenna.

2. The system of claim 1, wherein the first and second reception antennae are configured as fractal short dipole antennae configured to receive a predetermined wavelength corresponding to the location signal, and wherein the first and second reception antennae are configured to be fine-tunable to an actual wavelength of the location signal.

3. The system of claim 1, wherein the transmission unit is configured to transmit the location signal comprising a carrier component and a modulated component.

4. The system of claim 3, wherein the at least one reflection signal includes the carrier component and the modulated component, and wherein at least one of the first or second reception antenna comprises a respective full bridge diode circuit configured to act as a detector to detect the carrier component of the at least one reflection signal and to act as a mixer to detect the modulated component of the at least one reflection signal.

5. The system of claim 3, wherein the at least one reflection signal includes the carrier component and the modulated component, and wherein the processing unit is configured to determine if the carrier component of the at least one reflection signal and the modulated component of the at least one reflection signal correlate to each other, and to identify the at least one reflection signal as a reflection of the location signal if the carrier component and the modulated component of the at least one reflection signal correlate to each other.

6. The system of claim 1, wherein the location signal is configured as a telepowering signal configured to provide power to the balise.

7. The system of claim 1, wherein the processing unit is configured to determine if the target is functioning properly based on whether or not the uplink signal is received.

8. A method comprising:

transmitting, from a transmission unit comprising a transmission antenna disposed onboard a vehicle, a location signal to a balise disposed along a route as the vehicle traverses the route;

receiving, at a first reception antenna disposed onboard the vehicle, at least one reflection signal of the location signal reflected off the balise;

receiving, at a second reception antenna disposed onboard the vehicle, the at least one reflection signal reflected off the balise;

comparing a first amplitude of first reception information from the first reception antenna and a second amplitude of second reception information from the second reception antenna; and determining a location of the vehicle relative to the balise using a peak in a difference between the first and second amplitudes;

receiving an uplink signal from the balise;

determining a location of the vehicle relative to the balise using the relative strength of the received uplink signal; and comparing the determined locations to confirm the location of the vehicle wherein the first reception antenna and the second reception antenna are disposed on opposite sides of the transmission antenna.

9. The method of claim 8, wherein the first and second reception antennae are configured as fractal short dipole antennae configured to receive a predetermined wavelength corresponding to the location signal, and wherein the method further comprises fine-tuning the first and second reception antennae to an actual wavelength of the location signal.

10. The method of claim 8, wherein the location signal comprises a carrier component and a modulated component.

11. The method of claim 10, wherein the at least one reflection signal includes the carrier component and the modulated component, and wherein at least one of the first or second reception antenna comprises a full bridge diode circuit, the method comprising using the diode circuit as a detector to detect the carrier component of the at least one reflection signal and using the diode circuit as a mixer to detect the modulated component of the at least one reflection signal.

12. The method of claim 10, wherein the at least one reflection signal includes the carrier component and the modulated component, further comprising determining if the carrier component of the at least one reflection signal and the modulated component of the at least one reflection signal correlate to each other, and identifying the at least one reflection signal as a reflection of the location signal if the carrier component and the modulated component of the at least one reflection signal correlate to each other.

13. The method of claim 8, wherein the location signal is configured as a telepowering signal configured to provide power to the balise.

14. The method of claim 8, further comprising determining if the target is functioning properly based on whether or not the uplink signal is received.

* * * * *